(12) United States Patent
Faxér

(10) Patent No.: US 11,936,442 B2
(45) Date of Patent: Mar. 19, 2024

(54) MULTIBEAM PRECODER BASED CHANNEL STATE INFORMATION

(71) Applicant: Telefonaktiebolaget LM Ericsson (PUBL), Stockholm (SE)

(72) Inventor: Sebastian Faxér, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/599,151

(22) PCT Filed: Mar. 13, 2020

(86) PCT No.: PCT/EP2020/056992
§ 371 (c)(1),
(2) Date: Sep. 28, 2021

(87) PCT Pub. No.: WO2020/200711
PCT Pub. Date: Oct. 8, 2020

(65) Prior Publication Data
US 2022/0247459 A1   Aug. 4, 2022

Related U.S. Application Data

(60) Provisional application No. 62/826,542, filed on Mar. 29, 2019.

(51) Int. Cl.
*H04B 7/0417*   (2017.01)
*H04B 7/0456*   (2017.01)

(52) U.S. Cl.
CPC ......... *H04B 7/0417* (2013.01); *H04B 7/0486* (2013.01)

(58) Field of Classification Search
CPC .. H04B 7/0626; H04B 7/0417; H04B 7/0486; H04B 7/0478; H04B 7/0663
See application file for complete search history.

(56) References Cited

U.S. PATENT DOCUMENTS

2016/0337056 A1   11/2016   Frenne et al.
2018/0007668 A1   1/2018    Yum et al.
(Continued)

FOREIGN PATENT DOCUMENTS

EP   3949146 A1   10/2023

OTHER PUBLICATIONS

PCT Notification of Transmittal of the International Search Report and the Written Opinion of the International Searching Authority, or the Declaration issued for International application No. PCT/EP2020/056992—dated May 12, 2020.
(Continued)

*Primary Examiner* — Jaison Joseph
(74) *Attorney, Agent, or Firm* — BAKER BOTTS L.L.P.

(57) ABSTRACT

A method (1400) performed by a wireless device (200) for multibeam precoder based channel state information, CSI, feedback reporting is provided, A CSI report comprises a first part, CSI Part 1, and a second part, CSI Part 2. The method (1400) comprises generating (1401) the CSI report, wherein the CSI Part 1 comprises an indication of a number of non-zero coefficients, and a payload size of the indication of the number of non-zero coefficients is dependent on a rank restriction of the wireless device. The method also comprising transmitting (1402) the CSI report to a network node, wherein one or more of a payload of the CSI Part 2 and a payload size of the CSI Part 2 is based on the number of non-zero coefficients indicated in the CSI Part 1.

20 Claims, 12 Drawing Sheets

(56) References Cited

U.S. PATENT DOCUMENTS

| | | | |
|---|---|---|---|
| 2019/0052397 A1 | 2/2019 | Onggosanusi et al. | |
| 2019/0058517 A1* | 2/2019 | Kang | H04L 5/005 |
| 2019/0081676 A1 | 3/2019 | Wei et al. | |
| 2019/0215897 A1* | 7/2019 | Babaei | H04W 76/28 |
| 2021/0376887 A1* | 12/2021 | Wu | H04B 7/0639 |
| 2022/0149908 A1* | 5/2022 | Gao | H04B 7/0634 |
| 2022/0149909 A1* | 5/2022 | Liu | H04B 7/0456 |
| 2022/0247459 A1* | 8/2022 | Faxer | H04B 7/0486 |

OTHER PUBLICATIONS

3GPP TSG RAN WG1 Meeting Ad-Hoc Meeting 1901; Taipei, Taiwan; Source: Ericsson; Title: On CSI enhancements for MU-MIMO (R1-1900757)—Jan. 21-25, 2019.

3GPP TSG RAN WG1 Meeting #96; Athens, Greece; Source: Huawei, HiSilicon; Title: Discussion on CSI enhancement (R1-1901566)—Feb. 25-Mar. 1, 2019.

3GPP TSG RAN WG1 Meeting #96; Athens, Greece; Source: ZTE; Title: CSI Enhancement for MU-MIMO Support (R1-1901633)—Feb. 25-Mar. 1, 2019.

3GPP TSG RAN WG1 Meeting #96; Athens, Greece; Source: Qualcomm Incorporated; Title: CSI Enhancement for MU-MIMO Support (R1-1903042)—Feb. 25-Mar. 1, 2019.

3GPP TSG RAN WG1 Meeting RAN1#96-bis; Xi'an, China; Source: Ericsson; Title: On CSI enhancements for MU-MIMO (R1-1905110)—Apr. 8-12, 2019.

Office Action issued for Korean PatentApplication No. 10-2021-7035366—dated Jul. 25, 2023.

3GPP TSG RAN WG1 Meeting #96; Athens, Greece, Feb. 25-Mar. 1, 2019; Source: ZTE; Title: CSI Enhancement for MU-MIMO Support; Agenda Item: 7.2.8.1 (R1-1903343).

Search Report issued for Chinese Patent Application Serial No. 2020800399744—dated Nov. 29, 2023.

Official Action issued for Chinese Patent Application Serial No. 202080039974.4—dated Nov. 30, 2023.

* cited by examiner

FIG. 4

MULTIBEAM PRECODER BASED CHANNEL STATE INFORMATION

PRIORITY

This nonprovisional application is a U.S. National Stage Filing under 35 U.S.C. § 371 of International Patent Application Serial No. PCT/EP2020/056992 filed Mar. 13, 2020 and entitled "MULTIBEAM PRECODER BASED CHANNEL STATE INFORMATION" which claims priority to U.S. Provisional Patent Application No. 62/826,542 filed Mar. 29, 2019 both of which are hereby incorporated by reference in their entirety.

TECHNICAL FIELD

Embodiments herein relate generally to a base station and a method in the base station, and to a User Equipment (UE) and a method in the user equipment. More particularly the embodiments herein relate to multibeam or multi-layer precoder based channel state information (CSI) feedback.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Multi-antenna techniques can significantly increase the data rates and reliability of a wireless communication system. Equipping both the transmitter and the receiver with multiple antennas results in a multiple-input multiple-output (MIMO) communication channel that improves performance. Such systems and/or related techniques are commonly referred to as MIMO.

The New Radio (NR) standard is currently evolving with enhanced MIMO support. A core component in NR is the support of MIMO antenna deployments and MIMO related techniques, such as spatial multiplexing. The spatial multiplexing mode aims for high data rates in favorable channel conditions.

FIG. 1 provides an illustration of the spatial multiplexing operation. More particularly, FIG. 1 illustrates an example transmission structure of precoded spatial multiplexing mode in NR.

As seen in FIG. 1, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices. The precoder matrix is typically indicated by means of a precoder matrix indicator (PMI), which specifies a unique precoder matrix in the codebook for a given number of symbol streams. The transmission rank (r) symbols in s each correspond to a layer. In this way, spatial multiplexing is achieved since multiple symbols can be transmitted simultaneously over the same time/frequency resource element (TFRE). The number of symbols r is typically adapted to suit the current channel properties.

NR uses orthogonal frequency division multiplexing (OFDM) in the downlink (DL) and discrete Fourier transform (DFT) precoded OFDM in the uplink (UL). Hence, the received $N_R \times 1$ vector $y_n$ for a certain TFRE on subcarrier n (or alternatively data TFRE number n) is thus modeled by:

$$y_n = H_n W s_n + e_n$$

where $e_n$ is a noise/interference vector obtained as realizations of a random process. The precoder W can be a wideband precoder, which is constant over frequency, or precoder W can be frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace that is strong in the sense of conveying much of the transmitted energy to the user equipment (UE).

In closed-loop precoding for the NR DL, the UE transmits recommendations to the gNodeB (gNB) (base station in NR) of a suitable precoder to use. The UE bases these recommendations on channel measurements in the forward link (DL). The gNB configures the UE to provide feedback according to CSI-ReportConfig. The gNB may transmit channel state information reference signals (CSI-RS) and may configure the UE to use measurements of CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report (e.g., several precoders, one per subband). This is an example of the more general case of channel state information (CSI) feedback, which also encompasses feeding back other information than recommended precoders to assist the gNB in subsequent transmissions to the UE. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 physical resource blocks (PRBs) depending on the band width part (BWP) size.

Given the CSI feedback from the UE, the gNB determines the transmission parameters it wishes to use to transmit to the UE, including the precoding matrix, transmission rank, and modulation and coding scheme (MCS). These transmission parameters may differ from the recommendations that the UE makes. The number of columns of the precoder W reflects the transmission rank, and thus the number of spatially multiplexed layers. For efficient performance, it is important to select a transmission rank that matches the channel properties.

Certain examples of the present disclosure may be used with two-dimensional (2D) antenna arrays. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N=N_h N_v N_p$. Note that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

FIG. 2 illustrates an example of a 4×4 array with cross-polarized antenna elements. More particularly, FIG. 2 illustrates an example of a two-dimensional antenna array of cross-polarized antenna elements ($N_P=2$), with $N_h=4$ horizontal antenna elements and $N_v=4$ vertical antenna elements.

Precoding may be interpreted as multiplying the signal with different beamforming weights for each antenna prior to transmission. A typical approach is to tailor the precoder to the antenna form factor (i.e., taking into account $N_h$, $N_v$ and $N_p$ when designing the precoder codebook).

For CSI measurement and feedback, channel state reference signals (CSI-RS) are defined. A CSI-RS is transmitted on each transmit antenna (or antenna port) and is used by a UE to measure the DL channel between each of the transmit antenna ports and each of its receive antenna ports. The antenna ports are also referred to as CSI-RS ports. The number of antenna ports supported in NR are {1,2,4,8,12, 16,24,32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS. CSI-RS can be configured to be transmitted in certain slots and in certain resource elements (REs) in a slot.

FIG. 3 illustrates an example of RE allocation for a 12-port CSI-RS in NR. In the example of CSI-RS REs for 12 antenna ports illustrated in FIG. 3, 1 RE per RB per port is shown.

In addition, interference measurement resource (IMR) is also defined in NR for a UE to measure interference. An IMR resource contains 4 REs, either 4 adjacent RE in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI (i.e., rank, precoding matrix, and the channel quality).

Furthermore, a UE in NR may be configured to measure interference based on one or multiple NZP CSI-RS resources.

In CSI framework in NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report.

Each CSI reporting setting contains at least the following information:
A CSI-RS resource set for channel measurement;
An IMR resource set for interference measurement;
Optionally, a CSI-RS resource set for interference measurement;
Time-domain behavior (i.e., periodic, semi-persistent, or aperiodic reporting);
Frequency granularity (i.e., wideband or subband);
CSI parameters to be reported such as RI, PMI, CQI, and CSI-RS resource indicator (CRI) in case of multiple CSI-RS resources in a resource set;
Codebook types (i.e., type I or II), and codebook subset restriction (CBSR);
Measurement restriction; and
Subband size. One out of two possible subband sizes is indicated, the value range depends on the bandwidth of the BWP. One CQI/PMI (if configured for subband reporting) is fed back per subband.

When the CSI-RS resource set in a CSI reporting setting contains multiple CSI-RS resources, one of the CSI-RS resources is selected by a UE and a CSI-RS resource indicator (CRI) is also reported by the UE to indicate to the gNB about the selected CSI-RS resource in the resource set, together with RI, PMI and CQI associated with the selected CSI-RS resource.

For aperiodic CSI reporting in NR, more than one CSI reporting setting, each with a different CSI-RS resource set for channel measurement and/or resource set for interference measurement can be configured and triggered at the same time. In this case, multiple CSI reports are aggregated and sent from the UE to the gNB in a single physical uplink shared channel (PUSCH).

A common type of precoding is to use a DFT-precoder, where the precoder vector used to precode a single-layer transmission using a single-polarized uniform linear array (ULA) with N antennas is defined as:

$$w_{1D}(k) = \frac{1}{\sqrt{N}} \begin{bmatrix} e^{j2\pi \cdot 0 \frac{k}{QN}} \\ e^{j2\pi \cdot 1 \frac{k}{QN}} \\ \vdots \\ e^{j2\pi \cdot (N-1) \frac{k}{QN}} \end{bmatrix},$$

where $k=0,1,\ldots QN-1$ is the precoder index and Q is an integer oversampling factor. A corresponding precoder vector for a two-dimensional uniform planar array (UPA) can be created by taking the Kronecker product of two precoder vectors as $w_{2D}(k, l) = w_{1D}(k) \otimes w_{1D}(l)$. Extending the precoder for a dual-polarized URA may then be done as $$w_{2D,DP}(k, l, \phi) = \begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix},$$

where $e^{j\phi}$ is a co-phasing factor that may for instance be selected from Quadrature Phase Shift Keying (QPSK) alphabet $\phi \in$ $$\left\{0, \frac{\pi}{2}, \pi, \frac{3\pi}{2}\right\}.$$

A precoder matrix $W_{2D, DP}$ for multi-layer transmission may be created by appending columns of DFT precoder vectors as:

$$W_{2D,DP} = [W_{2D,DP}(k_1, l_1, \phi_1) W_{2D,DP}(k_2, l_2, \phi_2) \ldots W_{2D,DP}(k_R, l_R, \phi_R)],$$

where R is the number of transmission layers (i.e., the transmission rank). In a common special case for a rank-2 DFT precoder, $k_1=k_2=k$ and $l_1=l_2=l$, meaning that:

$$w_{2D,DP} = [\ w_{2D,DP}(k, l, \phi_1)\ \ w_{2D,DP}(k, l, \phi_2)] =$$

$$\begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}.$$

Such DFT-based precoders are used for instance in NR Type I CSI feedback.

With multi-user MIMO (MU-MIMO), two or more users in the same cell are co-scheduled on the same time-frequency resource. That is, two or more independent data streams are transmitted to different UEs at the same time, and the spatial domain is used to separate the respective streams. By transmitting several streams simultaneously, the capacity of the system can be increased. This however, comes at the cost of reducing the signal-to-interference-plus-noise ratio (SINR) per stream, as the power must be shared between streams and the streams will cause interference to each-other. One central part of MU-MIMO is to obtain accurate CSI that enables nullforming between co-scheduled users. Therefore, support has been added in Long Term Evolution (LTE) Release 14 (Rel-14) and NR Release 15 (Rel-15) for codebooks that provide more detailed CSI than the traditional single DFT-beam precoders. These codebooks are referred to as Advanced CSI (in LTE) or Type II codebooks (in NR) and can be described as a set of precoders where each precoder is created from multiple DFT beams. A multibeam precoder may be defined as a linear combination of several DFT precoder vectors as:

$$W = \sum_i c_i \cdot w_{2D,DP}(k_i, l_i, \phi_i),$$

where $\{c_i\}$ may be general complex coefficients. Such a multibeam precoder may more accurately describe the UE's channel and may thus bring an additional performance benefit compared to a DFT precoder, especially for MU-MIMO where rich channel knowledge is desirable in order to perform nullforming between co-scheduled UEs. For the NR Type II codebook in Rel-15, the precoding vector for each layer and subband is expressed in 3$^{rd}$ Generation Partnership Project (3GPP) TS 38.214 as:

$$W^l_{q_1,q_2,n_1,n_2,p_l^{(1)}p_l^{(2)},c_l} =$$

$$\frac{1}{\sqrt{N_1 N_2 \sum_{i=0}^{2L-1} (p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}, l = 1, 2$$

By restructuring the above formula and expressing it more simply, the precoder vector $w_{l,p}(k)$ can be formed for a certain layer l=0,1, polarization p=0,1 and resource block k=0, ..., $N_{RB}$−1 as:

$$w_{l,P}(k) = \frac{1}{C} \sum_{i=0}^{L-1} v_i p_{l,i}^{(1)} c_{l,i}(k)$$

Where $$c_{l,i}(k) = p_{l,i}^{(2)}\left(\left\lfloor\frac{k}{S}\right\rfloor\right)\varphi_{l,i}\left(\left\lfloor\frac{k}{S}\right\rfloor\right) \text{ for } p = 0 \text{ and } c_{l,i}(k) = p_{l,L+i}^{(2)}\left(\left\lfloor\frac{k}{S}\right\rfloor\right)\varphi_{i,L+i}\left(\left\lfloor\frac{k}{S}\right\rfloor\right)$$

for p=1, S is the subband size and $N_{SB}$ is the number of subbands in the CSI reporting bandwidth. Hence, the change in a beam coefficient across frequency $c_{l,i}(k)$ is determined based on the 2$N_{SB}$ parameters $p_{l,i}^{(2)}(0), \ldots, p_{l,i}^{(2)}(N_{SB}-1)$ and $\varphi_{l,i},(0), \ldots, \varphi_{l,i}(N_{SB}-1)$. Where the subband amplitude parameter $p_{l,i}^{(2)}$ is quantized using 0-1 bit and the subband phase parameter $\varphi_{l,i}$ is quantized using 2-3 bits, depending on codebook configuration.

In NR Rel-15, amplitude quantization for the Type II codebook is defined in 38.214 as:

The amplitude coefficient indicators $i_{1,4,\ l}$ and $i_{2,2,\ l}$ are $$i_{1,4,l} = [k_{l,0}^{(1)}, k_{l,0}^{(1)}, \ldots, k_{l,2L-1}^{(1)}]$$

$$i_{2,2,l} = [k_{l,0}^{(2)}, k_{l,1}^{(2)}, \ldots, k_{l,2L-1}^{(2)}] k_{l,i}^{(1)} \in \{0,1, \ldots 7\} k_{l,i}^{(2)} \in \{0,1\}$$

for l=1, ..., ν. The mapping from $k_{l,i}^{(1)}$ to the amplitude coefficient $p_{l,i}^{(1)}$ is given in Table 5.2.2.2.3-2 below and the mapping from $k_{l,i}^{(2)}$ to the amplitude coefficient $p_{l,i}^{(2)}$ is given in Table 5.2.2.2.3-3 below. The amplitude coefficients are represented by:

$$p_l^{(1)} = [p_{l,0}^{(1)}, p_{l,1}^{(1)}, \ldots, p_{l,2L-1}^{(1)}]$$

$$p_l^{(2)} = [p_{l,0}^{(2)}, p_{l,1}^{(2)}, \ldots, p_{l,2L-1}^{(2)}]$$

for l=1, ..., ν.

TABLE 5.2.2.2.3-2

Mapping of elements of $i_{1,4,\ l}$: $k_{l,i}^{(1)}$ to $p_{l,i}^{(1)}$

| $k_{l,i}^{(1)}$ | $p_{l,i}^{(1)}$ |
|---|---|
| 0 | 0 |
| 1 | $\sqrt{1/64}\sqrt{}$ |
| 2 | $\sqrt{1/32}\sqrt{}$ |
| 3 | $\sqrt{1/16}\sqrt{}$ |
| 4 | $\sqrt{1/8}\sqrt{}$ |
| 5 | $\sqrt{1/4}\sqrt{}$ |
| 6 | $\sqrt{1/2}\sqrt{}$ |
| 7 | 1 |

TABLE 5.2.2.2.3-3

Mapping of elements of $i_{2,2,\ l}$: $k_{l,i}^{(2)}$ to $p_{l,i}^{(2)}$

| $k_{l,i}^{(2)}$ | $p_{l,i}^{(2)}$ |
|---|---|
| 0 | $\sqrt{1/2}\sqrt{}$ |
| 1 | 1 |

The phase coefficient indicators are:

$$i_{2,1,l} = [c_{l,0}, c_{l,1}, \ldots, c_{l,2L-1}]$$

for l=1, ..., ν.

The amplitude and phase coefficient indicators are reported as follows:

The indicators $k_{l,i_{1,3},\ l}^{(1)}=7$, $k_{l,i_{1,3},\ l}^{(2)}=1$, and $c_{l,i_{1,3},\ l}=7=0$ (l=1, ..., ν). $k_{l,i_{1,3},\ l}^{(1)}$, $k_{l,i_{1,3},\ l}^{(2)}$, and $c_{l,i_{1,3},\ l}$ are not reported for l=1, ..., ν.

The remaining 2L−1 elements of $i_{1,4,\ l}$ (l=1, ..., ν) are reported, where $k_{l,i}^{(1)} \in \{0,1, \ldots, 7\}$. Let $M_l$ (l=1, ..., ν) be the number of elements of $i_{1,4,\ l}$ that satisfy $k_{l,i}^{(1)} > 0$.

The remaining 2L−1 elements of $i_{2,1,l}$ and $i_{2,2,l}$ (l=1, ..., ν) are reported as follows:

When subbandAmplitude is set to 'false',
$k_{l,i}^{(2)}=1$ for l=1, ..., ν, and i=0,1, ...,2L−1. $i_{2,2,l}$ is not reported for l=1, ..., ν.

For l=1, ..., ν, the elements of $i_{2,1,l}$, corresponding to the coefficients that satisfy $k_{l,i}^{(1)}>0$, i≠$i_{1,3,l}$, as determined by the reported elements of $i_{1,4,l}$, are reported, where $c_{l,i} \in \{0,1, ..., N_{PSK}−1\}$ and the remaining 2L−$M_l$ elements of $i_{2,1,l}$ are not reported and are set to $c_{l,i}=0$.

When subbandAmplitude is set to 'true',
For l=1, ..., ν, the elements of $i_{2,2,l}$ and $i_{2,1,l}$ corresponding to the min($M_l$, $K^{(2)}$)−1 strongest coefficients (excluding the strongest coefficient indicated by $i_{1,3,l}$), as determined by the corresponding reported elements of $i_{1,4,l}$, are reported, where $k_{l,i}^{(2)} \in \{0,1\}$ and $c_{l,i} \in \{0,1, ..., N_{PSK}−1\}$. The values of $K^{(2)}$ are given in Table 5.2.2.2.3-4. The remaining 2L−min($M_l$, $K^{(2)}$) elements of $i_{2,2,l}$ are not reported and are set to $k_{l,i}^{(2)}=1$. The elements of $i_{2,1,l}$ corresponding to the $M_l$−min($M_l$, $K^{(2)}$) weakest non-zero coefficients are reported, where $c_{l,i} \in \{0,1,2,3\}$. The remaining 2L−$M_l$ elements of $i_{2,1,l}$ are not reported and are set to $c_{l,i}=0$.

When two elements, $k_{l,x}^{(1)}$ and $k_{l,y}^{(1)}$, of the reported elements of $i_{1,4,l}$ are identical ($k_{l,x}^{(1)}=k_{l,y}^{(1)}$), then element min(x, y) is prioritized to be included in the set of the min($M_l$, $K^{(2)}$)−1 strongest coefficients for $i_{2,1,l}$ and $i_{2,2,l}$ (l=1, ..., ν) reporting.

In 3GPP TS 38.212, an indication of the number of non-zero wideband amplitude coefficients for a layer, l, is reported as depicted below.

The bitwidth for RI/LI/CQI of codebookType=typeII or codebookType=typeII-PortSelection is provided in Table 6.3.1.1.2-5 below.

TABLE 6.3.1.1.2-5

RI, LI, and CQI of codebookType = typeII or typeII-PortSelection

| Field | Bitwidth |
|---|---|
| Rank Indicator | min(1, $\lceil \log_2 n_{RI} \rceil$) |
| Layer Indicator | min(2, $\lceil \log_2 \upsilon \rceil$) |
| Wide-band CQI | 4 |
| Subband differential CQI | 2 |
| Indicator of the number of non-zero wideband amplitude coefficients $M_l$ for layer l | $\lceil \log_2(2L − 1) \rceil$ | where $n_{RI}$ is the number of allowed rank indicator values according to Subclauses 5.2.2.2.3 and 5.2.2.2.4 [6, TS 38.214] and ν is the value of the rank.

SUMMARY

According to a first aspect, a method performed by a wireless device for multibeam precoder based channel state information, CSI, feedback reporting is provided wherein a CSI report comprises a first part, CSI Part 1, and a second part, CSI Part 2. The method comprising generating the CSI report, wherein the CSI Part 1 comprises an indication of a number of non-zero coefficients, and a payload size of the indication of the number of non-zero coefficients is dependent on a rank restriction of the wireless device; and transmitting the CSI report to a network node, wherein one or more of a payload of the CSI Part 2 and a payload size of the CSI Part 2 is based on the number of non-zero coefficients indicated in the CSI Part 1.

In one example, the indication of the number of non-zero coefficients comprises an indicator of a number of non-zero coefficients for each layer and the number of non-zero coefficients for each layer is indicated with a layer-wise separate indicator in CSI Part 1. In another example, the indication of the number of non-zero coefficients indicates a sum of the non-zero coefficients across all layers. In another example the payload size of the indication of the number of non-zero coefficients is constant irrespective of a rank selection by the wireless device. In another example the indication of the number of non-zero coefficients is based on one or more of: allowable ranks the wireless device is allowed to select; and a maximum rank the wireless device is allowed to select. In another example the CSI Part 1 includes an explicit rank indication indicating the rank. In another example the CSI Part 1 indicates the rank implicitly based on the indication of the number of non-zero coefficients. In another example an indication of the rank and an indication of the number of non-zero coefficients are jointly encoded into a single index.

According to another aspect, a method performed by a network node for receiving multibeam precoder based channel state information, CSI, feedback is provided, wherein a CSI report comprises a first part, CSI Part 1, and a second part, CSI Part 2. The method comprising receiving, from a wireless device, the CSI Part 1, wherein the CSI Part 1 comprises an indication of a number of non-zero coefficients, and a payload size of the indication of the number of non-zero coefficients is dependent on a rank restriction of the wireless device; and determining, based on the indication of the number of non-zero coefficients, one or more of a CSI payload of the CSI Part 2 and a CSI payload size for the CSI Part 2.

In an example of this aspect, the indication of the number of non-zero coefficients comprises an indicator of a number of non-zero coefficients for each layer and the number of non-zero coefficients for each layer is indicated with a layer-wise separate indicator in the CSI Part 1. In another example, the indication of the number of non-zero coefficients indicates a sum of the non-zero coefficients across all layers. In another example, a payload size of the indication of the number of non-zero coefficients is constant irrespective of a rank selection by the wireless device. In another example, a payload size of the indication of the number of non-zero coefficients is based on one or more of: allowable ranks the wireless device is allowed to select; and a maximum rank the wireless device is allowed to select. In another example, the CSI Part 1 includes an explicit rank indication indicating the rank. In another example, the CSI Part 1 indicates the rank implicitly based on the indication of the number of non-zero coefficients. In another example, an indication of the rank and an indication of the number of non-zero coefficients are jointly encoded into a single index.

According to a further aspect, a wireless device is provided. The wireless device comprising processing circuitry and power supply circuitry configured to supply power to the wireless device, the processing circuitry configured to generate a CSI report for multibeam precoder based channel state information, CSI, feedback reporting, wherein the CSI report comprises a first part, CSI Part 1, and a second part, CSI Part 2, and wherein the CSI Part 1 comprises an indication of a number of non-zero coefficients, and a payload size of the indication of the number of non-zero coefficients is dependent on a rank restriction and transmit the CSI report to a network node, wherein one or more of a payload of the CSI Part 2 and a payload size of the CSI Part 2 is based on the number of non-zero coefficients indicated in the CSI Part 1.

In an example of this aspect, the indication of the number of non-zero coefficients comprises an indicator of a number of non-zero coefficients for each layer and the number of non-zero coefficients for each layer is indicated with a layer-wise separate indicator in CSI Part 1. In another example, the indication of the number of non-zero coefficients indicates a sum of the non-zero coefficients across all layers. In another example, a payload size of the indication of the number of non-zero coefficients is constant irrespective of a rank selection by the wireless device. In another example, payload size of the indication of the number of non-zero coefficients is based on one or more of: allowable ranks the wireless device is allowed to select; and a maximum rank the wireless device is allowed to select. In another example, the CSI Part 1 includes an explicit rank indication indicating the rank. In another example, the CSI Part 1 indicates the rank implicitly based on the indication of the number of non-zero coefficients. In another example, an indication of the rank and the indication of the number of non-zero coefficients are jointly encoded into a single index.

According to a further aspect, a network node is provided. The network node comprising processing circuitry and power supply circuitry (187) configured to supply power to the wireless device, the processing circuitry configured to receive a multibeam precoder based channel state information, CSI, feedback report from a wireless device, the CSI report comprising a first part, CSI Part 1, and a second part, CSI Part 2, wherein the CSI Part 1 comprises an indication of a number of non-zero coefficients, and a payload size of the indication of the number of non-zero coefficients is dependent on a rank restriction of the wireless device and determine, based on the indication of the number of non-zero coefficients, one or more of a CSI payload of the CSI Part 2 and a CSI payload size for the CSI Part 2.

In an example of this aspect, the indication of the number of non-zero coefficients comprises an indicator of the number of non-zero coefficients for each layer and the number of non-zero coefficients for each layer is indicated with a layer-wise separate indicator in the CSI Part 1. In another example, the indication of the number of non-zero coefficients indicates a sum of the non-zero coefficients across all layers In another example, the payload size of the indication of the number of non-zero coefficients is constant irrespective of a rank selection by the wireless device. In another example, the payload size of the indication of the number of non-zero coefficients is based on one or more of: allowable ranks the wireless device is allowed to select; and a maximum rank the wireless device is allowed to select. In another example, CSI Part 1 includes an explicit rank indication indicating the rank. In another example, the CSI Part 1 indicates the rank implicitly based on the indication of the number of non-zero coefficients. In another example, an indication of the rank and the indication of the number of non-zero coefficients are jointly encoded into a single index.

According to a further aspect, a computer program is provided. The computer program comprising instructions which when executed on a computer perform any one of the steps of any of the methods described above.

According to a further aspect, a computer program product, non-transitory computer-readable storage medium or carrier comprising a computer program, the computer program comprising instructions which when executed on a computer perform any one of the steps of any of the methods described above.

Certain examples may provide one or more of the following technical advantage(s). As one example, when higher-rank Type II codebooks are used, certain examples may advantageously reduce the overhead for indication of number of non-zero linear combining coefficient in CSI Part 1. Other advantages may be readily apparent to one having skill in the art. Certain examples may have none, some, or all of the recited advantages.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein:

FIG. 4: illustrates a matrix representation of multibeam precoder based CSI overhead reduction scheme, in accordance with certain examples.

DETAILED DESCRIPTION

Figure 1:
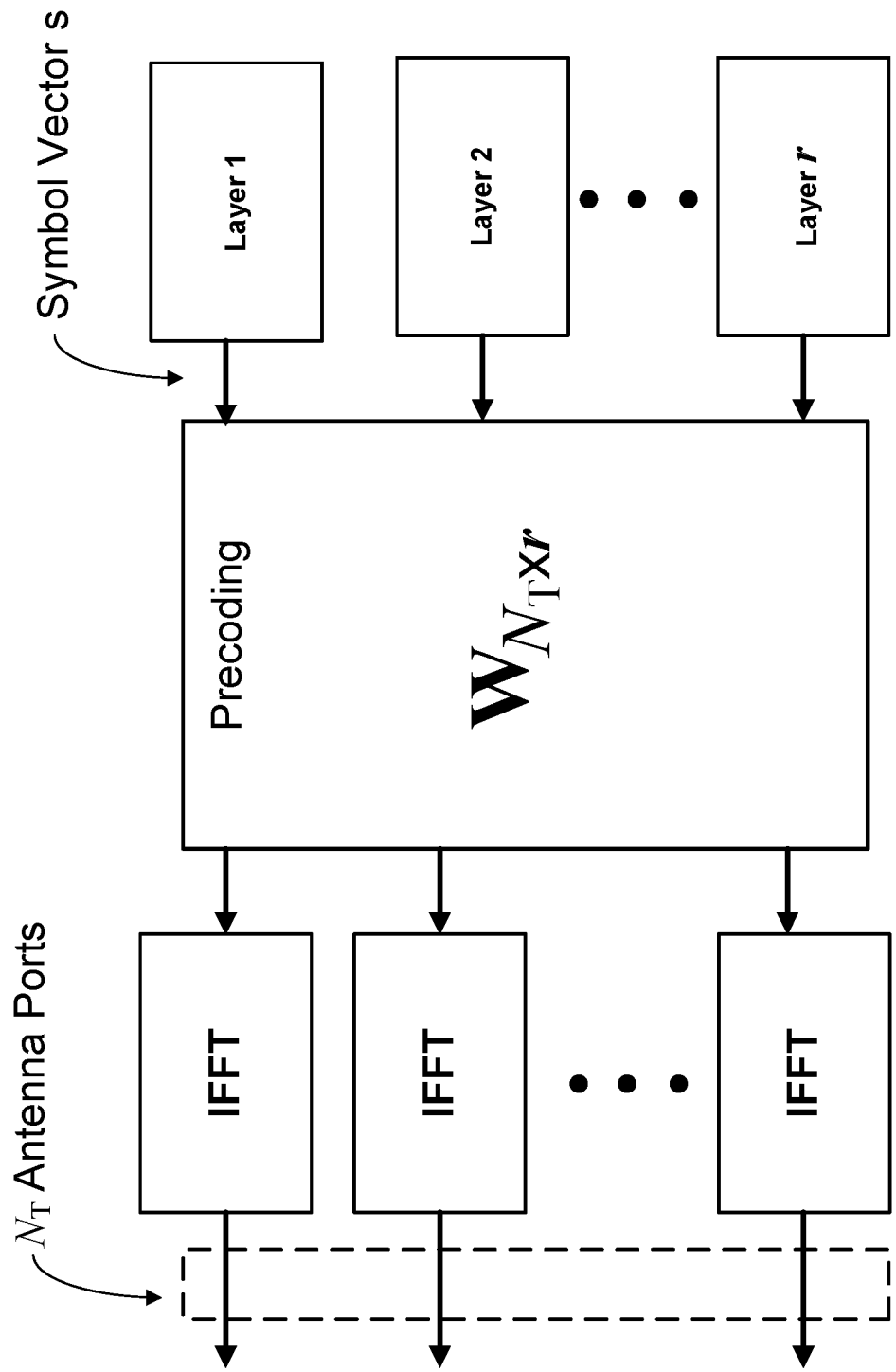
FIG. 1: illustrates a transmission structure of precoded spatial multiplexing mode in NR, in accordance with certain examples.
Figure 2:
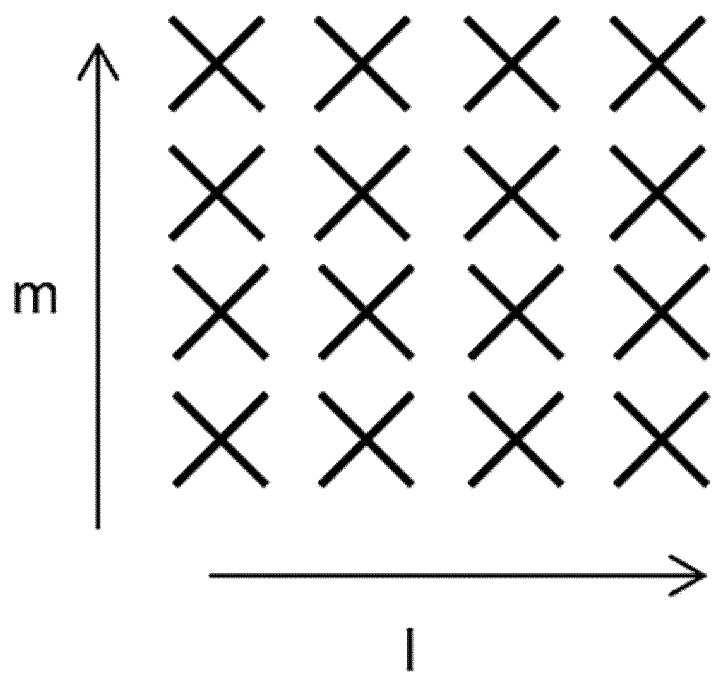
FIG. 2: illustrates a two-dimensional antenna array of cross-polarized antenna elements (N_P=2), with N_h=4 horizontal antenna elements and N_v=4 vertical antenna elements, in accordance with certain examples.
Figure 3:
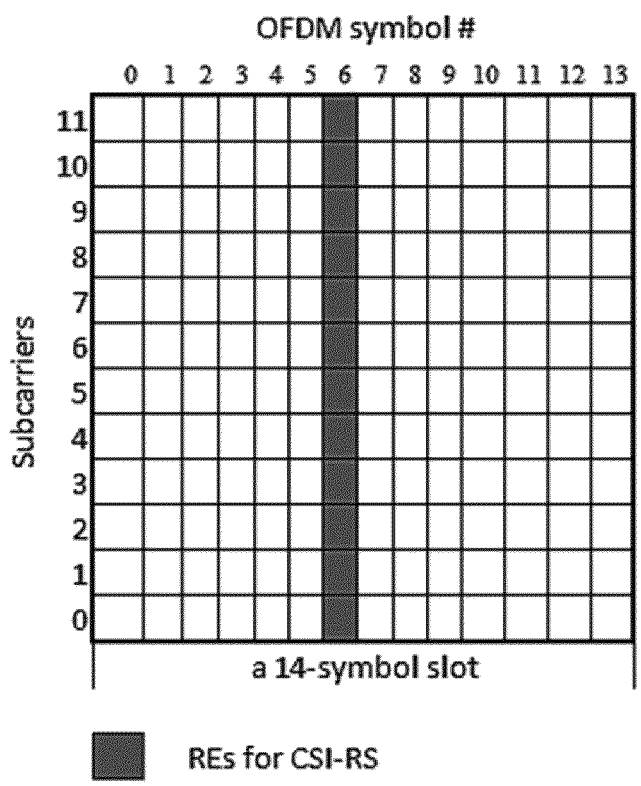
FIG. 3: illustrates an example of RE allocation for a 12-port CSI-RS in NR, in accordance with certain examples.

Some of the aspects contemplated herein will now be described more fully with reference to the accompanying drawings. Other examples, however, are contained within the scope of the subject matter disclosed herein, the disclosed subject matter should not be construed as limited to only the aspects set forth herein; rather, these aspects are provided by way of example to convey the scope of the subject matter to those skilled in the art.

As described above, in 3GPP NR, the PMI content is split into two separately encoded CSI parts (CSI Part 1 and CSI Part 2), where the CSI Part 1 payload is fixed while the CSI Part 2 payload is flexible and dependent on CSI Part 1. To know the payload size of CSI Part 2, the gNB needs to decode CSI Part 1. In the codebook, the wideband amplitude coefficients $p_{l,i}^{(1)}$ can take both non-zero and zero values. In case $p_{l,i}^{(1)}=0$ for some beam i, the corresponding subband (for all subbands) phase coefficients $\varphi_{l,i}$ (as indicated by $c_{l,i}$) and (if present) subband amplitude coefficient $p_{l,i}^{(2)}$ of course does not need to be reported (rather, they are undefined). Thus, to reduce PMI overhead, these parameters need not be reported in CSI Part 2, which means its payload can be reduced. However, if the CSI Part 2 payload is reduced and because the CSI Part 2 payload must be indicated by CSI Part 1, there needs to be an indicator in CSI Part 1 of how many non-zero wideband amplitude coefficients are present in CSI Part 2. Another option would be to include the wideband amplitude coefficients themselves in CSI Part 1, but this would make CSI Part 1 unnecessarily large. Thus, in the NR Rel-15 solution, the number of non-zero wideband amplitude coefficients is indicated in CSI Part 1 using $\lceil \log_2(2L-1) \rceil$ bits for a layer. Based on this indication, the gNB knows the size of CSI Part 2 and can decode it.

Then, the gNB reads the wideband amplitude indicators $k_{l,i}^{(1)}$, where some values may be set to zero. The gNB then reads the subband amplitude/phase coefficients, and based on which wideband amplitude indicators $k_{l,i}^{(1)}$ are zero and non-zero, knows which coefficients map to each beam. In 3GPP NR Rel-16, Type II overhead reductions should be considered. A strong correlation between different values of $c_{l,i}(k)$, for different values of k has been observed, and one could exploit this correlation to perform efficient compression of the information in order to reduce the number of bits required to represent the information. This would lower the amount of information that needs to be signaled from the UE to the gNB, which is relevant from several aspects. Both lossy (implying a potentially decreased level of quality in the CSI) as well as lossless compression may be considered.

In the case of lossy compression there are many ways to parametrize the beam coefficients over frequency to achieve an appropriate CSI quality vs. overhead trade-off. By keeping the basic structure of the precoder as described above, one may update the expression for $c_{l,i}(k)$. More generally, one can describe $c_{l,i}(k)$ as a function $f(k, \alpha_0, \ldots, \alpha_{M-1})$ that is based on the M parameters $\alpha_0, \ldots, \alpha_{M-1}$, where these M parameters in turn are represented using a number of bits which can be fed back as part of the CSI report.

As an example, consider the special case where $f(k, \alpha_0, \ldots, \alpha_{M-1})$ constitutes a linear transformation. In this case, the function can be expressed by using a transformation matrix $$B = \begin{bmatrix} b_{0,0} & \cdots & b_{0,K} \\ \vdots & \ddots & \vdots \\ b_{N_{RB},0} & \cdots & b_{N_{RB},K} \end{bmatrix} = [b_0 \ldots b_K],$$

i.e., consisting of K number of $N_{RB} \times 1$ sized basis vectors along with a coefficient vector $$a = \begin{bmatrix} a_0 \\ \cdots \\ a_{K-1} \end{bmatrix}.$$

Here, $N_{RB}$ is the number of resource blocks in the CSI reporting bandwidth. One can also consider other granularities and units of the basis vectors, such as the number of subbands $N_{SB}$, a subcarrier level granularity with $12N_{RB} \times 1$ size basis vectors, or an arbitrary number of resource blocks.

The M parameters can, for instance, be split up into a parameter I, selecting the K basis vectors from a set of basis vector candidates, and the coefficients $\alpha_0, \ldots, \alpha_{K-1}$. That is, some index parameter I determines the basis matrix B, for instance, by selecting columns from a wider matrix or by some other arbitrary way. The beam coefficients may then be expressed as:

$$c_{l,i}(k) = f(k, I, a_0, \ldots, a_{K-1}) = [B]_{k,:} a = \sum_{d=0}^{K-1} b_{k,d} a_d.$$

That is, by forming a vector with all the beam coefficients (for a beam)

$$c_{l,i} = \begin{bmatrix} c_{l,i}(0) \\ \cdots \\ c_{l,i}(N_{RB}-1) \end{bmatrix},$$

that vector can be expressed as a linear transformation $c_{l,i} = B\alpha_i$. In fact, the entire precoder can be expressed using matrix formulation, which is good for illustrative purposes. The beam coefficients for all the beams i and resource blocks k can be stacked into a matrix $$C_F = \begin{bmatrix} c_{i,0}^T \\ \cdots \\ c_{l,2L-1}^T \end{bmatrix}$$

which then can be expressed as $$C_F = \begin{bmatrix} c_{l,0}^T \\ \cdots \\ c_{l,2L-1}^T \end{bmatrix} = \begin{bmatrix} a_0^T B^T \\ \cdots \\ a_{2L-1}^T B^T \end{bmatrix} = \begin{bmatrix} a_0^T \\ \cdots \\ a_{2L-1}^T \end{bmatrix} B^T = \tilde{C}_F B^T.$$

One can also express the linear combination of beam basis vectors and beam coefficients as a matrix product. This implies that the precoders (for all resource blocks) for a certain layer can be expressed as a matrix product $W_F = W_1 C_F = W_1 \ddot{C}_F B_T$. That is, we apply from the left a spatial linear transformation (from antenna domain to beam domain) by multiplication of $W_1$ and from the right a frequency linear transformation by multiplication of $B^T$. The precoders are then expressed more sparsely using a smaller coefficient matrix $\ddot{C}_F$ in this transformed domain.

Figure 4:
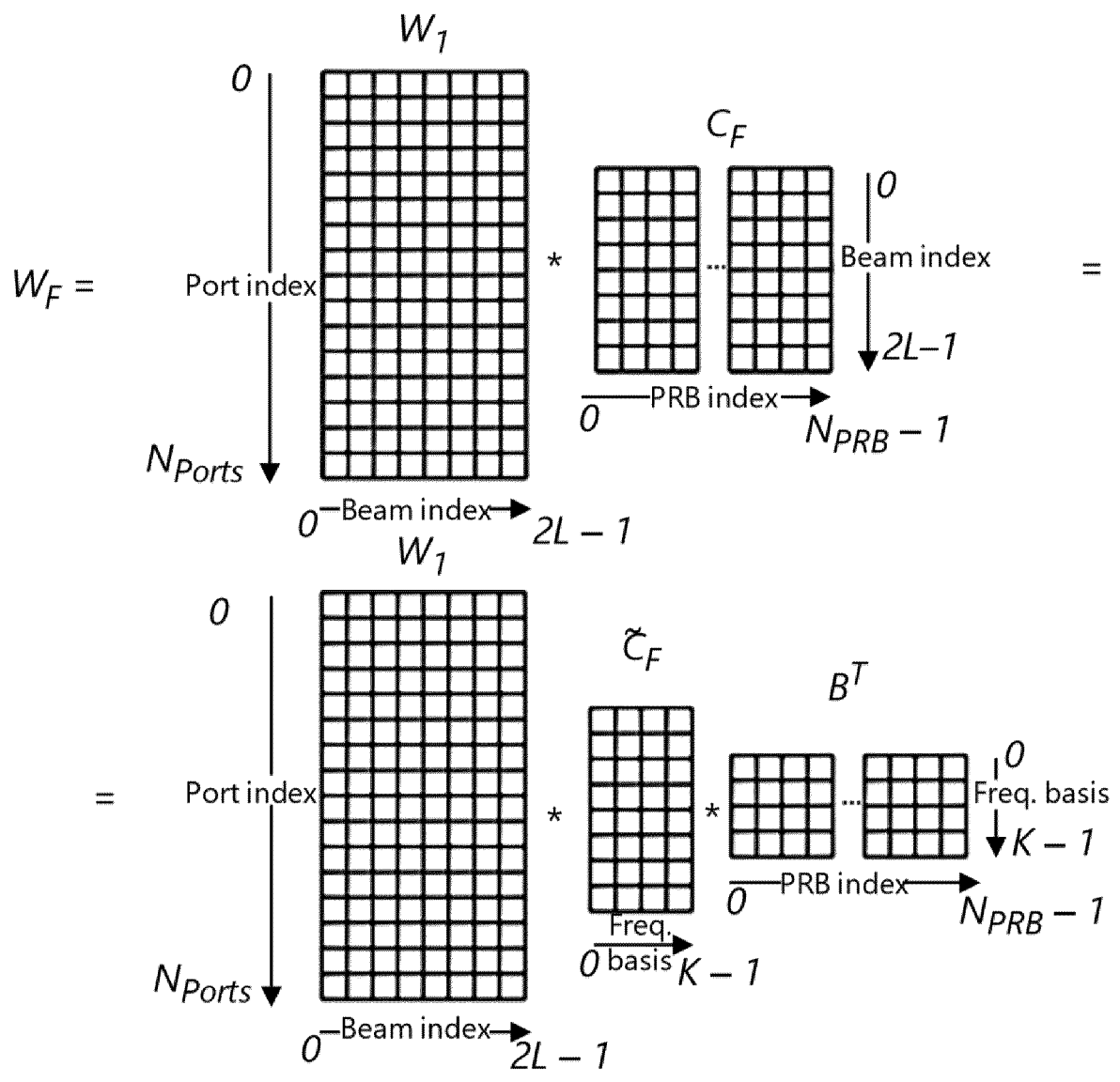

FIG. 4 illustrates the matrix representation of Type II overhead reduction scheme. In RAN1 #95, a codebook structure as the one described in the previous section has been agreed for rank 1 and rank 2 codebook:

Precoders for a layer is given by size-P×$N_3$ matrix $W = W_1 \ddot{W}_2 W_f^H$
  $P = 2N_1N_2 = $#SD dimensions
  $N_3 = $#FD dimensions
    $N_3 = N_{SB}R$ where $N_{SB}$ is the number of CQI subbands and R=1,2 configurable
  Precoder normalization: the precoding matrix for given rank and unit of $N_3$ is normalized to norm 1/sqrt (rank)
Spatial domain (SD) compression
  L spatial domain basis vectors (mapped to the two polarizations, so 2L in total) selected
  Compression in spatial domain using $$W_1 = \begin{bmatrix} v_0 v_1 \ldots v_{L-1} & 0 \\ 0 & v_0 v_1 \ldots v_{L-1} \end{bmatrix},$$

where $\{v_i\}_{i=0}^{L-1}$ are $N_1 N_2 \times 1$ orthogonal DFT vectors (same as Rel. 15 Type II)
  Frequency-domain (FD) compression
    Common selection for all the 2L beams, but only a size-$K_0$<2LM subset of coefficients are reported (not reported coefficients are treated as zero)
    $W_f = [f_{k_0} f_{k_1} \ldots f_{k_{M-1}}]$ where $\{f_{k_m}\}_{m=0}^{M-1}$ are M size-$N_3 \times 1$ orthogonal DFT vectors
  The number of FD-basis vectors $$M = \left\lceil p \times \frac{N_3}{R} \right\rceil, \text{ with } p = \left\{\frac{1}{4}, \frac{1}{2}\right\}$$

Linear combination coefficients (for a layer)
  $\ddot{W}_2$ is composed of K=2LM linear combination (LC) coefficients, but (K – $K_0$) of its coefficients are zero
  The value of $K_0 = \lceil \beta \times 2LM \rceil$, $\beta \in \{1/4, 1/2, 3/4\}$,
  The non-zero coefficients per layer is indicated with a size 2LM bitmap
  Each coefficient is quantized with 3 bits amplitude and 4 bits phase
    Amplitude is relative a per-polarization reference amplitude, which is quantized with 4 bits
On basis/coefficient subset selection for the first layer, it is proposed to support the following:
  Size-$K_0 K_0$ subset design: down select in RAN1 #96 from the following alternatives
    Alt1. Unrestricted subset (size=2LM)
    Alt2. Polarization-common subset (size=LM)
    Alt3. Restricted subset (for a given subset of beams and FD basis, size=2L+M)
  The value of $K_0 = \lceil \beta \times 2LM \rceil$ $K_0 = \lceil \beta \times 2LM \rceil$ where two values of β are supported
    Down select in RAN1 #96 from $\beta \in \{1/8, 1/4, 1/2, 3/4\}$ $\beta \in \{1/8, 1/4, 1/2, 3/4\}$
  The UCI consists of two parts:
    Information pertaining to the number(s) of non-zero coefficients is reported in UCI part 1
      Note: This does not imply whether this information consists of single or multiple values
      The payload of UCI part 1 remains the same for different RI value(s)
    Bitmap is used to indicate non-zero coefficient indices
On subset selection for layer 0, the following has been proposed:
  Unrestricted (polarization-independent) subset selection which requires a size-2LM bitmap in UCI part 2
  $\beta \in \{1/4, 1/2, 3/4\}$ $\beta \in \{1/4, 1/2, 3/4\}$
    FFS: Further down selection of supported combinations of FD compression parameters
On subset selection for Rl=2, the following has been proposed:
  SD basis selection (selection of L out of N1N2 SD DFT vectors) is layer-common
  Terms:
    "FD basis subset selection" refers to the selection of M out of $N_3$ FD DFT vectors
    "Coefficient subset selection" refers to the selection of $K_{NZ}$ (#non-zero coefficients) out of 2LM where $K_{NZ} \leq K_0$
  The size-$K_0$ subset design for layer 0 is also applied to layer 1
  $K_0$ is the maximum number of non-zero coefficients for each layer.
UCI parameters as follows have been considered/proposed:

TABLE 1

List of agreed UCI parameters

| Parameter | Location | Details/description |
|---|---|---|
| # NZ coefficients | UCI part 1 | FFS: Exact design (joint or separate across layer) |
| Wideband CQI | UCI part 1 | Same as R15 |
| Subband CQI | UCI part 1 | Same as R15 |
| Bitmap per layer | UCI part 2 | RI = 1-2: for layer l, size-$2L_l M_l$ FFS: exact design for RI = 3-4 (depending on subset selection) |
| Strongest coefficient indicator (SCI) | UCI part 2 | FFS: Exact design for all layers (bitwidth, etc.) |
| SD basis subset selection indicator | UCI part 2 | FFS: Exact design depending on decision for SD/FD basis parameter setup for RI = 3-4 |
| FD basis subset selection indicator | UCI part 2 | FFS: Exact design depending on decision for SD/FD basis parameter setup for RI = 3-4, Impact of the bitwidth if subset restriction is supported. |
| LC coefficients: phase | UCI part 2 | Quantized independently across layers |
| LC coefficients: amplitude | UCI part 2 | Quantized independently across layers (including reference amplitude for weaker polarization, for each layer) |

TABLE 2

List of UCI parameters for further discussion

| Parameter | Location | Details/description |
|---|---|---|
| RI | UCI part 1 | The need depends on the exact design of # NZ coefficients (NZC) indicator |
| M' | UCI part 1 | Whether to report M' ≤ M, e.g. # bits, values |
| $N'_3$ | UCI part 1 | Whether to report $N'_3 < N_3$, # bits, values |
| $N'_1, N'_2$ | UCI part 1 | Whether to report $N'_1 < N_1$, $N'_2 < N_2$, # bits, values |
| Size of the bitmap(s) in UCI Part2: $N_b$ | UCI part 1 | Whether to report $N_b$, #bits, values |
| Indication of zero Pol-reference amplitude values | UCI part 1 | Specific design pending |

TABLE 2-continued

List of UCI parameters for further discussion

| Parameter | Location | Details/description |
|---|---|---|
| Oversampling (rotation) factor | UCI part 2 | e.g. values of qi, i = 1, 2, 3 (3 values) |

It has been agreed to extend the Type II DFT-based compression (designed for Rl=1-2) to Rl=3-4 with the following design principle:
  The resulting overhead for Rl=3-4 is at least comparable to that for Rl=2.
  For Rl∈{3,4}, different layers are independently quantized just as Rl=1 and 2.
  On SD and FD basis selection for Rl∈{3,4}
  The parameter R is layer-common and Rl-common
  For the higher-layer setting of SD/FD basis parameters (L, p):
    Down select among the following alternatives for the higher-layer setting of SD/FD basis parameters (L, p):
      Alt1 Rl-common for Rl∈{1,2,3,4}, layer-common
      Alt2 Rl-common for Rl∈{1,2,3,4}, layer-/layer-group-specific
      Alt3 Rl-common for Rl∈{3,4}, layer-common
      Alt4 Rl-common for Rl∈{3,4}, layer-/layer-group-specific
      Alt5 Rl-specific for Rl∈{3,4}, layer-common
      Alt6 Rl-specific for Rl∈{3,4}, layer-/layer-group-specific
    Note: For Rl=1 and 2, Rl-common, layer-common setting has been agreed
    Note: No other alternatives will be considered
  On the max #NZ coefficients for Rl∈{3,4}, down select from the following alternatives (no other alternatives will be considered):
    Alt0. For Rl∈{1,2,3,4}, there is only one β value
    Alt1. Total max #NZ coefficients across all layers ≤2$K_0$ (the $K_0$ value set for Rl∈{1,2})
    Alt2. For Rl∈{3,4}, there is only one value of max #NZ coefficients per layer <$K_0$ where the $K_0$ value is set for Rl∈{1,2}
    Alt3. Total max #NZ coefficients across all layers ≤2α$K_0$. (the $K_0$ value set for Rl∈{1,2} where a is fixed and RI-specific
      FFS: value of a per agreement that the overhead for Rl=3 or 4 should at least be comparable to Rl=2
    Alt4. For Rl∈{3,4}, there is only one value of max #NZ coefficients per layer <α$K_0$ where the $K_0$ value is set for Rl∈{1,2} where α is fixed and RI-specific
      FFS: value of α per agreement that the overhead for Rl=3 or 4 should at least be comparable to Rl=2
    Note: For Rl∈{1,2}, there is only one $K_0$ value (=max #NZ coefficients per layer)

There currently exist certain challenges. For example, for higher rank Type II codebooks, simply extending the lower rank designs and Uplink Control Information (UCI) parameter allocation may result in too large overhead. Certain aspects of the present disclosure and their examples may provide solutions to these or other challenges. For example, the present disclosure contemplates examples that exploit various ways to reduce the overhead for number on non-zero coefficient indication when multibeam precoder based CSI feedback, e.g. NR Type II CSI, is used. The present disclosure considers also higher rank (e.g., up to rank-4) Type II codebooks with characteristics as described above in the Introduction section.

For each layer l=0, . . . , R−1, where R is the selected rank, an SD-basis selection (selecting 2$L_{R,l}$ spatial domain basis vectors) and an FD-basis selection (selecting $M_{R,l}$ frequency domain basis vectors) is applied. In certain examples, the SD and/or FD basis selection may be done jointly for all layers. In certain examples, the SD and/or FD basis selection may be done jointly for layers in a layer group (e.g., layers 0, 1 constitute a first layer group and layers 2, 3 constitute a second layer group). In certain examples, the SD and/or FD basis selection may be done independently per layer.

The parameter setting for the SD and FD bases (i.e., the number of selected SD/FD basis vectors 2$L_{R,l}$ and $M_{R,l}$) may in the general case be both rank-specific and layer-specific, as indicated by the sub-indices (R, l) and as illustrated in Table 3 below. However, a practical selection would be to have at least some rank-common and/or layer-common selection of $L_{R,l}$ and $M_{R,l}$. As per previous agreements, rank-common and layer-common parameter setting may be used for Rl=1,2.

TABLE 3

Illustration of possible rank-specific and layer-specific parameter settings

| Rank (RI) | Layer | $L_{R,l}$ | $M_{R,l}$ |
|---|---|---|---|
| 1 | 0 | $x_0$ | $y_0$ |
| 2 | 0 | | |
|   | 1 | | |
| 3 | 0 | $u_{3,0}$ | $v_{3,0}$ |
|   | 1 | $u_{3,1}$ | $v_{3,1}$ |
|   | 2 | $u_{3,2}$ | $v_{3,2}$ |
| 4 | 0 | $u_{4,0}$ | $v_{4,0}$ |
|   | 1 | $u_{4,1}$ | $v_{4,1}$ |
|   | 2 | $u_{4,2}$ | $v_{4,2}$ |
|   | 3 | $u_{4,3}$ | $v_{4,3}$ |

For each layer l=0, . . . , R−1, there are thus 2$L_{R,l}M_{R,l}$ possible LC coefficients in the transformed domain. It can be assumed that a number $K_1(l) \leq 2L_{R,l}M_{R,l}$ are non-zero coefficients which are reported. It may also be assumed that the subset selection of these $K_1(l)$ non-zero coefficients from the total 2$L_{R,l}M_{R,l}$ coefficients, for each layer, is reported using a size-2$L_{R,l}M_{R,l}$ bitmap (where, for example, a bit equal to 1 indicates that the corresponding coefficient is included in the reported subset and a 0 that it is not included and the coefficient is assumed to be zero).

The amplitude and phase of each coefficient $c_{i,m}$ included in the reported subset is then reported. For instance, $c_{i,m}=p_{i,m}\varphi_{i,m}$, where $p_{i,m}$ is the amplitude coefficient while $\varphi_{i,m}$ is a phase coefficient. Or, alternatively, $c_{i,m}=p_{i,m}p_{i,m}^{REF}\varphi_{i,m}$, where $p_{i,m}^{REF}$ is a reference amplitude which may or may not be reported.

Consider a case where the UE determines a maximum number of non-zero coefficients $K_0(R, l)$ for each layer l and rank hypothesis R.

For instance, the UE may be configured with a nominal maximum number of coefficients $K_0^{(nom)}$ which is directly applicable to first rank hypothesis and/or set of layers. For other rank hypotheses and/or set of layers, $K_0$ may be derived based on the nominal value. For instance, for ranks 1 and 2 $K_0=K^{nom}$) while for ranks 3 and 4 $K_0=K_0^{(nom)}/2$. Alternatively, a β-value may be configured and $K_0$ may be determined as $K_0=\lceil \beta \times 2L_{R,l}M_{R,l}\rceil$.

As described, the UE may determine that the actual number of non-zero coefficients for a layer is smaller than the maximum number of NZ coefficients (i.e., $K_1(l) \leq K_0(R, l) \leq 2L_{R,l} M_{R,l}$). Thus, the CSI payload content (in CSI Part 2) can vary both depending on the UE-indicated rank as well as the actual number of NZ coefficients for each layer.

This method provides efficient ways of indicating the CSI Part 2 payload and payload size for multiple layers by providing indications of the rank and number of non-zero coefficients in CSI Part 1 (which has a fixed payload size). The parameter setting for the spatial domain (SD) and frequency domain (FD) bases, i.e. the number of selected SD/FD basis vectors $2L_{R,l}$ and $M_{R,l}$ may in the general case be both rank-specific and layer-specific as indicated by the sub-indices (R, l) which denote the rank and layer index respectively. For each layer l=0, . . . , R−1, there are thus $2L_{R,l} M_{R,l}$ possible LC coefficients in the transformed domain and it can be assumed that a number $K_1(l) \leq K_0(R, l) < 2L_{R,l} M_{R,l}$ are non-zero coefficients which are reported. According to the agreement, $K_1(l)$ for l=0, . . . , R−1 should be conveyed in UCI Part 1, however there are different approaches as to how this can be achieved.

In certain examples, the number of non-zero coefficients (NNZC) for each layer $K_1(l)$ is indicated with a layer-wise separate indicator in CSI Part 1, i.e. a UCI parameter defined for the CSI part 1 Since the rank selection of the UE is not known to the network node (e.g., gNB) prior to decoding CSI Part 1, the CSI Part 1 payload needs to be rank independent or rank-agnostic. In the general case (pending the higher rank codebook agreements), $K_0(R_i, l) \neq K_0(R_j, l)$ and the maximum NNZC for a layer may be rank-dependent. In this case, the indication of the NNZC may have the bitwidth $$\left\lceil \log_2 \max_R K_0(R, l) \right\rceil$$

(i.e., it is set according to the maximum $K_0$ value across the rank hypotheses). This enables the CSI Part 1 payload to be constant irrespective of UEs rank selection. The indicator of the NNZC may be reported for each layer l=0, . . . , $R_{max}$ −1, where $R_{max}$ is the maximum rank a UE can report. For $R_{max}$=4, the payload is thus $$\sum_{l=0}^{3} \left\lceil \log_2 \max_R K_0(R, l) \right\rceil.$$

The maximum rank would depend on which codebook is used (i.e. rank 3,4 codebooks ON or OFF) and the RI restriction.

It may be assumed that at least one coefficient is non-zero for each layer and hence only the value range $K_1=1, \ldots, K_0$ needs to be signaled. In certain examples, however, it may be assumed that zero coefficients per layer may also be indicated and in that case the bitwidth may be calculated as $$\left\lceil \log_2 \left(1 + \max_R K_0(R, l)\right) \right\rceil.$$

If K_1=0 is included in the value range, a separate RI indication would not be needed an instead the RI could be determined implicitly be observing which K_1 values are set to zero. However, it is clearer to include the RI as an independent parameter.

In certain examples, the payload size of the NNZC indication depends on the allowable rank(s) and/or maximum rank a UE is allowed to select. For instance, if the UE is instructed to maximum report rank-2, there is no need to include NNZC indication for 4 layers in the CSI Part 1. Therefore, the number of per-layer NNZC indications may be determined from the maximum allowed rank. Additionally, the bitwidth of the NNZC indication may be determined based on the allowed subset of ranks $R_{allowed}$ a UE can select, such as $$\left\lceil \log_2 \max_{R \in R_{allowed}} K_0(R, l) \right\rceil.$$

For instance $R_{allowed}=\{1,2,4\}$ if only ranks 1, 2 and 4 are allowed to be selected by the UE. In some cases, the allowed rank subset and/or maximum allowed rank may be determined from the rank restriction signaling as part of the CSI Report Configuration. Alternatively or additionally, the maximum rank may be signaled implicitly by the selection of codebook to be used (e.g., as part of the CSI Report Configuration) or by a separate parameter (for instance switching between rank 1-2 only or rank 1-4).

In any of the above-described examples, an explicit rank indication (RI) may be included in CSI Part 1 in order to indicate the rank selection. In an alternative example, a RI may not be included in CSI Part 1 and instead the rank may be implicitly determined based on the NNZC indicators (let $NNZCI_l$ denote the indicated NNZC for layer l). For instance, if $NNZCI_l=0$ for l>R, the gNB may infer that the selected rank is R. In certain examples, the RI and NNZCI may be jointly encoded into a single index in order to conserve the overhead. This is illustrated in Table 4 below using an example with max rank 2 and at most $K_0=3$ coefficients for each layer. For separate indication, 1+2+2=5 bits are needed, while for the proposed joint indication only 4 bits are needed.

TABLE 4

Example of joint encoding of RI and NNZCI per layer

| Joint Index | RI | NNZCI$_0$ | NNZCI$_1$ |
|---|---|---|---|
| 0 | 1 | 1 | N/A |
| 1 | 1 | 2 | N/A |
| 2 | 1 | 3 | N/A |
| 3 | 2 | 1 | 1 |
| 4 | 2 | 1 | 2 |
| 5 | 2 | 1 | 3 |
| 6 | 2 | 2 | 1 |
| 7 | 2 | 2 | 2 |
| 8 | 2 | 2 | 3 |
| 9 | 2 | 3 | 1 |
| 10 | 2 | 3 | 2 |
| 11 | 2 | 3 | 3 |
| 12 | Reserved | | |
| 13 | | | |
| 14 | | | |
| 15 | | | |

Since a purpose of including the number of NNZC indicator(s) in CSI Part 1 is to determine the payload of CSI Part 2, i.e. the UCI parameters of the CSI Part 2, the total number of non-zero coefficients across all layers may, in certain examples, be indicated instead of having layer-wise indication. That is, a single UCI parameter indicating the sum of the NNZC across layers may be indicated in CSI Part 1. That is, $K_1^{(TOT)} = \sum_{l=0}^{R-1} K_1(l)$ is indicated, where R is the selected rank by the UE. Since per-layer NZC bitmaps are included in CSI Part 2 (e.g. UCI parameters of CSI part 2), the gNB can infer the distribution of the NZCs among the layers and there is no ambiguity. The required bitwidth for $K_1^{(TOT)}$ indication is thus $$\max_R \lceil \log_2 \sum_{l=0}^{R-1} K_0(R, l) \rceil,$$

where again one takes the maximum across the allowed ranks in order to have the CSI Part 1 payload, e.g. UCI parameters in CSI part 1, rank-independent. This may, in some cases, reduce overhead compared to having per-layer NNZC indication, however it requires that the RI is explicitly included as a parameter in CSI Part 1, e.g. a UCI parameter, in order to determine the rank selection.

In one variant of this example, as part of the codebook configuration, the UE may be configured with or otherwise determine a maximum NNZC summed over the all layers (for a given rank). Thus, the UE may be configured with $K_0^{(TOT)} = \sum_{l=0}^{R-1} K_0(l)$ (or a separate $K_0^{(TOT)}$ for each rank hypothesis, or with a nominal $K_0^{(TOT)}$ wherefrom the per-rank $K_0^{(TOT)}$ values may be determined). This can enable the UE to freely distribute the budgeted $K_0^{(TOT)}$ coefficients between the layers in order to optimize the precoding performance. For instance, the UE may determine that some layers have more non-zero coefficients than others and therefore choose the allocate more feedback bits to said layers.

As an example, for $K_0=28$ and rank-4, per layer NNZC indication could yield an overhead of $\sum_{l=0}^{3} \lceil \log_2 28 \rceil = 20$ bits while the total NNZC indication could yield an overhead of $\lceil \log_2 \sum_{l=0} 28 \rceil = 7$ bits. Joint number of non-zero coefficient indication across layers can reduce overhead compared to layer-wise non-zero coefficient indication and separate RI encoding in UCI parameters of CSI Part 1. If layer-common NNZC indication is used, the UE may be configured with $K_0^{TOT} = \sum_{l=0}^{R-1} K_0(l)$ but can freely distribute the budgeted $K_0^{(TOT)}$ coefficients between the layers in order to optimize the precoding performance. For instance, the UE may determine that some layers have more non-zero coefficients than others and therefore choose the allocate more feedback bits to said layers. Since the gNB can determine the distribution of the non-zero coefficients by looking at the bitmap, there is no ambiguity. The bitmap design should be rather straightforward, i.e. for layer l, the bitmap size is $2L_lM_l$.

The design of the UCI parameter(s) for the strongest coefficient indicator (SCI) may be based on the indicated $K_1 \leq K_0 < 2LM$ non-zero coefficients in the bitmap for a certain layer, one has to be indicated as the strongest coefficient. This can be done using $\lceil \log_2 K_1 \rceil$ bits, if $K_1$ is known prior to decoding the UCI parameters of a CSI Part 2. Depending on the design, $K_1$ is either explicitly indicated in UCI parameters of the CSI Part 1, where a bitwidth of $\lceil \log_2 K_1 \rceil$ for the SCI per layer in UCI parameters of the CSI Part 2 can be directly applied. Or, a total number of non-zero coefficients across all layers is indicated in UCI parameters of the CSI Part 1, whereby each individual $K_1$ per layer is unknown. In that case, the bitwidth of the SCI per layer needs to be fixed to $\lceil \log_2 K_0 \rceil$. However, since the difference between $K_1$ and $K_0$ likely is small, the bitwidth may in most cases be the same regardless. The SCI thus indicates one out of $K_1$ coefficients as the strongest. This of course assumes some ordering of the 2LM coefficients in the bitmap, for instance assuming a row-first ordering or column-first ordering, but this should be straightforward. In some examples, the SCI per layer may be indicated using $\lceil \log_2 K_0 \rceil$ or $\lceil \log_2 K_1 \rceil$ bits, depending on the outcome of other UCI design aspects.

In some examples the SD and FD subset selection in UCI with combinatorial numbering is indicated using $$\left\lceil \log_2 \binom{N_1 N_2}{L} \right\rceil \text{ bits}$$

bits and additionally 2+2 bits for rotation factors) and $$\left\lceil \log_2 \binom{N_3}{M} \right\rceil \text{ bits,}$$

respectively. However, depending on the solution selected for ranks 3-4, some variations may have to be made. However, regarding "Impact of the bitwidth if subset restriction is supported" for FD-basis. Current codebook subset restriction (CBSR) in LTE and NR does not impact the PMI payload. In fact, that is a defining characteristic of CBSR. If PMI payload is adapted based on FD-basis restriction, it is not CBSR but rather a part of the codebook parameterization. This is discussed further in [1]. In some examples FD-basis CBSR, if supported, does not impact UCI design or bitwidth of UCI parameters In some examples additional UCI parameters relate to change the codebook parametrization dynamically and indicate this in UCI:

| | | |
|---|---|---|
| M' | UCI/CSI part 1 | Whether to report M' ≤ M, e.g. # bits, values |
| N'$_3$ | UC/CSII part 1 | Whether to report N'$_3$ < N$_3$, # bits, values |
| N'$_1$, N'$_2$ | UCI/CSI part 1 | Whether to report N'$_1$ < N$_1$, N'$_2$ < N$_2$, # bits, values |
| Size of the bitmap(s) in UCI/CSI Part2: N$_b$ | UCI/CSI part 1 | Whether to report N$_b$, #bits, values |

Regarding N'$_1$, N'$_2$, N'$_3$, a motivation may be to be to select a layer-common intermediary basis subset wherefrom a layer-specific basis can be selected. The motivation for including a report of N'$_1$, N'$_2$, N'$_3$ in UCI Part 1 would be to allow the UE to dynamically select the size of the intermediary basis subset so as to optimize the SD/FD basis indication overhead dynamically in UCI parameter of CSI Part 2. However, the overhead for basis indication is comparably not very large, and it is not clear how much overhead can be conserved with such as scheme. Therefore, this does not warrant dynamic intermediary subset basis size indication in UCI Part 1 (which due to the lower code rate of UCI parameters in CSI Part 1 likely does not even bring any overhead reduction in total). However, a layer-common intermediary basis subset approach can still be considered in UCI design. But in that case, it should be a fixed (predefined or configured) intermediary subset basis size, so that no UCI parameter in a CSI Part 1 indication is needed. I.e. the intermediary subset can be part of the FD/SD basis indication in UCI parameters of the CSI Part 2. In some examples no support of intermediary FD/SD basis subset size indication in UCI parameters of a CSI Part 1 is provided. If intermediary FD/SD basis subset selection is supported, fixed intermediary FD/SD basis subset size is used.

In other examples a second parameter relates to the UE dynamically selecting the size of the FD-basis and reporting this in a UCI parameter of the CSI Part 1. This means that the UE can determine that only a number M' FD-basis vectors is needed in order to describe the channel, which is smaller than the number of configured FD-basis vectors M. That his functionality is somewhat overlapping with the indication of the number of non-zero coefficients. I.e. if only M' basis vectors are used, the UE can indicate this in UCI parameter of CSI Part 2 by setting one or more columns to zero in the bitmap. The corresponding coefficients are then not reported which reduces the overhead with 2L×(M−M')×6 bits. If additionally, M' is report in a UCI parameter of CSI Part 1, the bitmap in UCI parameter of CSI Part 2 can be reduced in size, but this only saves with 2L×(M−M') additional bits. I.e. 85% of the overhead reduction is already achieved. It some examples therefore dynamic reporting of M' is not required. If the UE is consistently reporting many zero coefficients for some FD-basis vectors, the gNB can reconfigured the CSI Report Setting to smaller M value or choose to trigger another pre-configured CSI Report Setting with smaller M value. When Dynamic reporting of M'<M is overlapping functionality with the reporting of number of non-zero coefficients reporting of M'<M in UCI parameters of CSI Part 1 may not be supported.

In some examples, the size of the bitmaps in UCI parameters of CSI Part 1 are explicitly reported. Although the gNB can decode the UCI parameters of the CSI Part 2 if it knows the size of the bitmaps from decoding UCI parameters of the CSI Part 1, it does not know how to interpret the bitmaps. I.e. it does not know in which dimension the bitmaps were reduced or which bitmap for which layer was re-dimensioned. Thus, this information needs to be included in UCI parameters of a CSI Part 2 as well, which implies that for each layer, combinatorial signalling of additional FD and SD intermediary basis subset selection must be introduced. This requires many new UCI Parameters and likely the resulting overhead would be increased rather than reduced. Oversampling of the FD-basis does not impact the performance, which can be showed quite simply mathematically. Therefore, the rotation/oversampling factors should not be included in the codebook design and hence also not reported in UCI.

In some examples, if both UE and NW implement multibeam or multi-layer precoder based CSI feedback according to 3GPP 38.212 V15.5,0, at type II CSI report may be lost depending on if interpretation is aligned between UE and NW or not. In other examples only one of a UE and NW implement according to 015.5.0 but the other one does not then also type II CSI report may be lost depending on if interpretation is aligned between UE and NW. The following is an example of 3GPP specifications adapted in accordance with some of the aspects described herein.

6.3.1.1.2 CSI Only

The bitwidth for PMI of codebookType=type1-SinglePanel with 2 CSI-RS ports is 2 for Rank=1 and 1 for Rank=2, according to Subclause 5.2.2.2.1 in [6, TS 38.214].

The bitwidth for PMI of codebookType=type1-SinglePanel with more than 2 CSI-RS ports is provided in Tables 6.3.1.1.2-1, where the values of $(N_1, N_2)$ and $(O_1, O_2)$ are given by Subclause 5.2.2.2.1 in [6, TS 38.214].

TABLE 6.3.1.1.2-1

| | PMI of codebookType=type1-SinglePanel | | | | |
|---|---|---|---|---|---|
| | Information field $X_1$ for wideband PMI | | | Information field $X_2$ for wideband PMI or per subband PMI | |
| | $(i_{1,1}, i_{1,2})$ | | | $i_2$ | |
| | codebookMode=1 | codebookMode=2 | $i_{1,3}$ | codebookMode=1 | codebookMode=2 |
| Rank = 1 with >2 CSI-RS ports, $N_2 > 1$ | $\lceil \log_2(N_1 O_1 \cdot N_2 O_2) \rceil$ | $\left\lceil \log_2\left(\frac{N_1 O_1}{2} \cdot \frac{N_2 O_2}{2}\right) \right\rceil$ | N/A | 2 | 4 |
| Rank = 1 with >2 CSI-RS ports, $N_2 = 1$ | $\lceil \log_2(N_1 O_1 \cdot N_2 O_2) \rceil$ | $\left\lceil \log_2\left(\frac{N_1 O_1}{2}\right) \right\rceil$ | N/A | 2 | 4 |
| Rank = 2 with 4 CSI-RS ports, $N_2 = 1$ | $\lceil \log_2(N_1 O_1 \cdot N_2 O_2) \rceil$ | $\left\lceil \log_2\left(\frac{N_1 O_1}{2}\right) \right\rceil$ | 1 | 1 | 3 |
| Rank = 2 with >4 CSI-RS ports, $N_2 > 1$ | $\lceil \log_2(N_1 O_1 \cdot N_2 O_2) \rceil$ | $\left\lceil \log_2\left(\frac{N_1 O_1}{2} \cdot \frac{N_2 O_2}{2}\right) \right\rceil$ | 2 | 1 | 3 |
| Rank = 2 with >4 CSI-RS ports, $N_2 = 1$ | $\lceil \log_2(N_1 O_1 \cdot N_2 O_2) \rceil$ | $\left\lceil \log_2\left(\frac{N_1 O_1}{2}\right) \right\rceil$ | 2 | 1 | 3 |
| Rank = 3 or 4, with 4 CSI-RS ports | $\lceil \log_2(N_1 O_1 \cdot N_2 O_2) \rceil$ | | 0 | 1 | |
| Rank = 3 or 4, with 8 or 12 CSI-RS ports | $\lceil \log_2(N_1 O_1 \cdot N_2 O_2) \rceil$ | | 2 | 1 | |
| Rank = 3 or 4, with >=16 CSI-RS ports | $\left\lceil \log_2\left(\frac{N_1 O_1}{2} \cdot N_2 O_2\right) \right\rceil$ | | 2 | 1 | |

TABLE 6.3.1.1.2-1-continued

| | PMI of codebookType=typeI-SinglePanel | | | | |
|---|---|---|---|---|---|
| | Information field $X_1$ for wideband PMI | | | Information field $X_2$ for wideband PMI or per subband PMI | |
| | $(i_{1,1}, i_{1,2})$ | | | $i_2$ | |
| | codebookMode=1 | codebookMode=2 | $i_{1,3}$ | codebookMode=1 | codebookMode=2 |
| Rank = 5 or 6 | $\lceil \log_2(N_1 O_1 \cdot N_2 O_2) \rceil$ | | N/A | | 1 |
| Rank = 7 or 8, $N_1 = 4, N_2 = 1$ | $\lceil \log_2\left(\frac{N_1 O_1}{2} \cdot N_2 O_2\right) \rceil$ | | N/A | | 1 |
| Rank = 7 or 8, $N_1 > 2, N_2 = 2$ | $\lceil \log_2\left(N_1 O_1 \cdot \frac{N_2 O_2}{2}\right) \rceil$ | | N/A | | 1 |
| Rank = 7 or 8, with $N_1 > 4, N_2 = 1$ or $N_1 = 2, N_2 = 2$ or $N_1 > 2, N_2 > 2$ | $\lceil \log_2(N_1 O_1 \cdot N_2 O_2) \rceil$ | | N/A | | 1 |

The bitwidth for PMI of codebookType=type1-MultiPanel is provided in Tables 6.3.1.1.2-2, where the values of $(N_g, N_1, N_2)$ and $(O_1, O_2)$ are given by Subclause 5.2.2.2.2 in [6, TS 38.214].

TABLE 6.3.1.1.2-2

| | PMI of codebookType = type I-MultiPanel | | | | | | | | |
|---|---|---|---|---|---|---|---|---|---|
| | Information fields $X_1$ for wideband | | | | | Information fields $X_2$ for wideband or per subband | | | |
| | $(i_{1,1}, i_{1,2})$ | $i_{1,3}$ | $i_{1,4,1}$ | $i_{1,4,2}$ | $i_{1,4,3}$ | $i_2$ | $i_{2,0}$ | $i_{2,1}$ | $i_{2,2}$ |
| Rank = 1 with $N_g = 2$ codebookMode = 1 | $\lceil \log_2(N_1 O_1 \cdot N_2 O_2) \rceil$ | N/A | 2 | N/A | N/A | 2 | N/A | N/A | N/A |
| Rank = 1 with $N_g = 4$ codebookMode = 1 | $\lceil \log_2(N_1 O_1 \cdot N_2 O_2) \rceil$ | N/A | 2 | 2 | 2 | 2 | N/A | N/A | N/A |
| Rank = 2 with $N_g = 2$, $N_1 N_2 = 2$ codebookMode = 1 | $\lceil \log_2(N_1 O_1 \cdot N_2 O_2) \rceil$ | 1 | 2 | N/A | N/A | 1 | N/A | N/A | N/A |
| Rank = 3 or 4 with $N_g = 2$, $N_1 N_2 = 2$ codebookMode = 1 | $\lceil \log_2(N_1 O_1 \cdot N_2 O_2) \rceil$ | 0 | 2 | N/A | N/A | 1 | N/A | N/A | N/A |
| Rank = 2 or 3 or 4 with $N_g = 2$, $N_1 N_2 > 2$ codebookMode = 1 | $\lceil \log_2(N_1 O_1 \cdot N_2 O_2) \rceil$ | 2 | 2 | N/A | N/A | 1 | N/A | N/A | N/A |
| Rank = 2 with $N_g = 4$, $N_1 N_2 = 2$ codebookMode = 1 | $\lceil \log_2(N_1 O_1 \cdot N_2 O_2) \rceil$ | 1 | 2 | 2 | 2 | 1 | N/A | N/A | N/A |
| Rank = 3 or 4 with $N_g = 4$, $N_1 N_2 = 2$ codebookMode = 1 | $\lceil \log_2(N_1 O_1 \cdot N_2 O_2) \rceil$ | 0 | 2 | 2 | 2 | 1 | N/A | N/A | N/A |
| Rank = 2 or 3 or 4 with $N_g = 4$, $N_1 N_2 > 2$ codebookMode = 1 | $\lceil \log_2(N_1 O_1 \cdot N_2 O_2) \rceil$ | 2 | 2 | 2 | 2 | 1 | N/A | N/A | N/A |
| Rank = 1 with $N_g = 2$, codebookMode = 2 | $\lceil \log_2(N_1 O_1 \cdot N_2 O_2) \rceil$ | N/A | 2 | 2 | N/A | N/A | 2 | 1 | 1 |
| Rank = 2 with $N_g = 2$, $N_1 N_2 = 2$ codebookMode = 2 | $\lceil \log_2(N_1 O_1 \cdot N_2 O_2) \rceil$ | 1 | 2 | 2 | N/A | N/A | 1 | 1 | 1 |
| Rank = 3 or 4 with $N_g = 2$, $N_1 N_2 = 2$ codebookMode = 2 | $\lceil \log_2(N_1 O_1 \cdot N_2 O_2) \rceil$ | 0 | 2 | 2 | N/A | N/A | 1 | 1 | 1 |

TABLE 6.3.1.1.2-2-continued

| | PMI of codebookType = type I-MultiPanel | | | | | | | | |
|---|---|---|---|---|---|---|---|---|---|
| | | Information fields $^{X1}$ for wideband | | | | Information fields $^{X2}$ for wideband or per subband | | | |
| | $(i_{1,1}, i_{1,2})$ | $i_{1,3}$ | $i_{1,4,1}$ | $i_{1,4,2}$ | $i_{1,4,3}$ | $i_2$ | $i_{2,0}$ | $i_{2,1}$ | $i_{2,2}$ |
| Rank = 2 or 3 or 4 with $N_g = 2$, $N_1N_2 > 2$ codebookMode = 2 | $\lceil \log_2(N_1O_1 \cdot N_2O_2) \rceil$ | 2 | 2 | 2 | N/A | N/A | 1 | 1 | 1 |

The bitwidth for PMI with 1 CSI-RS port is 0.

The bitwidth for RI/LI/CQI/CRL of codebookType=type1-SinglePanel is provided in Tables 6.3.1.1.2-3.

TABLE 6.3.1.1.2-3

| | RI, LI, CQI, and CRI of codebookType = typeI-SinglePanel | | | | |
|---|---|---|---|---|---|
| | Bitwidth | | | | |
| | 1 antenna | 2 antenna | 4 antenna | >4 antenna ports | |
| Field | port | ports | ports | Rank1~4 | Rank5~8 |
| Rank Indicator | 0 | $\min(1, \lceil \log_2 n_{RI} \rceil)$ | $\min(2, \lceil \log_2 n_{RI} \rceil)$ | $\lceil \log_2 n_{RI} \rceil$ | $\lceil \log_2 n_{RI} \rceil$ |
| Layer Indicator | 0 | $\lceil \log_2 v \rceil$ | $\min(2, \lceil \log_2 v \rceil)$ | $\min(2, \lceil \log_2 v \rceil)$ | $\min(2, \lceil \log_2 v \rceil)$ |
| Wide-band CQI | 4 | 4 | 4 | 4 | 8 |
| Subband differential CQI | 2 | 2 | 2 | 2 | 4 |
| CRI | $\lceil \log_2(K_s^{CSI-RS}) \rceil$ | $\lceil \log_2(K_s^{CSI-RS}) \rceil$ | $\lceil \log_2(K_s^{CSI-RS}) \rceil$ | $\lceil \log_2(K_s^{CSI-RS}) \rceil$ | $\lceil \log_2(K_s^{CSI-RS}) \rceil$ |

$n_{RI}$ in Table 6.3.1.1.2-3 is the number of allowed rank indicator values according to Subclause 5.2.2.2.1 [6, TS 38.214]. $v$ is the value of the rank. The value of $K_s^{CSI-RS}$ is the number of CSI-RS resources in the corresponding resource set. The values of the rank indicator field are mapped to allowed rank indicator values with increasing order, where '0' is mapped to the smallest allowed rank indicator value.

The bitwidth for RI/LI/CQI/CRI of codebookType=type1-MultiPanel is provided in Table 6.3.1.1.2-4.

TABLE 6.3.1.1.2-4

| RI, LI, CQI, and CRI of codebookType = typeI-MultiPanel | |
|---|---|
| Field | Bitwidth |
| Rank Indicator | $\min(2, \lceil \log_2 n_{RI} \rceil)$ |
| Layer Indicator | $\min(2, \lceil \log_2 v \rceil)$ |
| Wide-band CQI | 4 |
| Subband differential CQI | 2 |
| CRI | $\lceil \log_2(K_s^{CSI-RS}) \rceil$ | where $n_{RI}$ is the number of allowed rank indicator values according to Subclause 5.2.2.2.2 [6, TS 38.214], $v$ is the value of the rank, and $K_s^{CSI-RS}$ is the number of CSI-RS resources in the corresponding resource set. The values of the rank indicator field are mapped to allowed rank indicator values with increasing order, where '0' is mapped to the smallest allowed rank indicator value.

The bitwidth for RI/LI/CQI of codebookType=typeII or codebookType=typeII-PortSelection is provided in Table 6.3.1.1.2-5.

TABLE 6.3.1.1.2-5

| RI, LI, and CQI of codebookType = typeII or typeII-PortSelection | |
|---|---|
| Field | Bitwidth |
| Rank Indicator | $\min(1, \lceil \log_2 n_{RI} \rceil)$ |
| Layer Indicator | $\min(2, \lceil \log_2 v \rceil)$ |
| Wide-band CQI | 4 |
| Subband differential CQI | 2 |
| Indicator of the number of non-zero wideband amplitude coefficients $M_l$ for layer l | $\lceil \log_2(2L - 1) \rceil$ | where $n_{RI}$ is the number of allowed rank indicator values according to Subclauses 5.2.2.2.3 and 5.2.2.2.4 [6, TS 38.214] and $v$ is the value of the rank. The values of the rank indicator field are mapped to allowed rank indicator values with increasing order, where '0' is mapped to the smallest allowed rank indicator value. The bitwidth for CRI, SSBRI, RSRP, and differential RSRP are provided in Table 6.3.1.1.2-6.

TABLE 6.3.1.1.2-6

| CRI, SSBRI, and RSRP | |
|---|---|
| Field | Bitwidth |
| CRI | $\lceil \log_2(K_s^{CSI-RS}) \rceil$ |
| SSBRI | $\lceil \log_2(K_s^{SSB}) \rceil$ |
| RSRP | 7 |
| Differential RSRP | 4 | where $K_s^{CSI-RS}$ is the number of CSI-RS resources in the corresponding resource set, and $K_s^{SSB}$ is the configured number of SS/PBCH blocks in the corresponding resource set for reporting 'ssb-Index-RSRP'.

TABLE 6.3.1.1.2-7

Mapping order of CSI fields of one CSI report,
pmi-FormatIndicator = widebandPMI and
cqi-FormatIndicator = widebandCQI

| CSI report number | CSI fields |
|---|---|
| CSI report #n | CRI as in Tables 6.3.1.1.2-3/4, if reported<br>Rank Indicator as in Tables 6.3.1.1.2-3/4, if reported<br>Layer Indicator as in Tables 6.3.1.1.2-3/4, if reported<br>Zero padding bits $O_P$, if needed<br>PMI wideband information fields $X_1$, from left to right as in Tables 6.3.1.1.2-1/2, if reported<br>PMI wideband information fields $X_2$, from left to right as in Tables 6.3.1.1.2-1/2, or codebook index for 2 antenna ports according to Subclause 5.2.2.2.1 in [6, TS38.214], if reported<br>Wideband CQI as in Tables 6.3.1.1.2-3/4, if reported |

The number of zero padding bits $O_P$ in Table 6.3.1.1.2-7 is 0 for 1 CSI-RS port and $O_P$, $N_{max} - N_{reported}$ for more than 1 CSI-RS port, where $$N_{max} = \max_{r \in S_{Rank}} B(r)$$

and $S_{Rank}$ is the set of rank values r that are allowed to be reported;
$N_{reported} = B(R)$, where R is the reported rank;
For 2 CSI-RS ports, $B(r) = N_{PMI}(r) + N_{CQI}(r) + N_{LI}(r)$;
For more than 2 CSI-RS ports, $B(r) = N_{PMI, i1}(r) + N_{PMI, i2}(r) + N_{CQI}(r) + N_{LI}(r)$;
if PMI is reported, $N_{PMI}(1) = 2$ and $N_{PMI}(2) = 1$; otherwise, $N_{PMI}(r) = 0$.
if PMI i1 is reported, $N_{PMI, i1}(r)$ is obtained according to Tables 6.3.1.1.2-1/2; otherwise, $N_{PMI, i1}(r) = 0$;
if PMI i2 is reported, $N_{PMI, i2}(r)$ is obtained according to Tables 6.3.1.1.2-1/2; otherwise, $N_{PMI, i2}(r) = 0$;
if CQI is reported, $N_{CQI}(r)$ is obtained according to Tables 6.3.1.1.2-3/4; otherwise, $N_{CQI}(r) = 0$;
if LI is reported, $N_{LI}(r)$ is obtained according to Tables 6.3.1.1.2-3/4; otherwise, $N_{LI}(r) = 0$.

TABLE 6.3.1.1.2-8

Mapping order of CSI fields of one report
for CRI/RSRP or SSBRI/RSRP reporting

| CSI report number | CSI fields |
|---|---|
| CSI report #n | CRI or SSBRI #1 as in Table 6.3.1.1.2-6, if reported<br>CRI or SSBRI #2 as in Table 6.3.1.1.2-6, if reported<br>CRI or SSBRI #3 as in Table 6.3.1.1.2-6, if reported<br>CRI or SSBRI #4 as in Table 6.3.1.1.2-6, if reported<br>RSRP #1 as in Table 6.3.1.1.2-6, if reported<br>Differential RSRP #2 as in Table 6.3.1.1.2-6, if reported<br>Differential RSRP #3 as in Table 6.3.1.1.2-6, if reported<br>Differential RSRP #4 as in Table 6.3.1.1.2-6, if reported |

TABLE 6.3.1.1.2-9

Mapping order of CSI fields of one CSI report,
CSI part 1, pmi-FormatIndicator = subbandPMI
or cqi-FormatIndicator = subbandCQI

| CSI report number | CSI fields |
|---|---|
| CSI report #n<br>CSI part 1 | CRI as in Tables 6.3.1.1.2-3/4, if reported<br>Rank Indicator as in Tables 6.3.1.1.2-3/4/5, if reported<br>Wideband CQI for the first TB as in Tables 6.3.1.1.2-3/4/5, if reported<br>Subband differential CQI for the first TB with increasing order of subband number as in Tables 6.3.1.1.2-3/4/5, if reported<br>Indicator of the number of non-zero wideband amplitude coefficients $M_l$ for layer l-0 as in Table 6.3.1.1.2-5, if reported<br>Indicator of the number of non-zero wideband amplitude coefficients $M_l$ for layer 1 as in Table 6.3.1.1.2-5, if 2-layer PMI reporting is allowed according to the rank restriction in Subclause 5.2.2.2.2 [6, TS 38.214] and if reported |

Note:
Subbands for given CSI report n indicated by the higher layer parameter csi-ReportingBand are numbered continuously in the increasing order with the lowest subband of csi-ReportingBand as subband 0.

TABLE 6.3.1.1.2-10

Mapping order of CSI fields of one CSI report, CSI part 2 wideband,
pmi-FormatIndicator = subbandPMI or cqi-FormatIndicator = subbandCQI

| CSI report number | CSI fields |
|---|---|
| CSI report #n<br>CSI part 2<br>wideband | Wideband CQI for the second TB as in Tables 6.3.1.1.2-3/4/5, if present and reported<br>Layer Indicator as in Tables 6.3.1.1.2-3/4/5, if reported<br>PMI wideband information fields $X_1$, from left to right as in Tables 6.3.1.1.2-1/2, if reported<br>PMI wideband information fields $X_2$, from left to right as in Tables 6.3.1.1.2-1/2, or codebook index for 2 antenna ports according to Subclause 5.2.2.2.1 in [6, TS38.214], if pmi-FormatIndicator = widebandPMI and if reported |

TABLE 6.3.1.1.2-11

Mapping order of CSI fields of one CSI report, CSI part 2 subband,
pmi-FormatIndicator = subbandPMI or cqi-FormatIndicator = subbandCQI

| CSI report #n<br>Part 2 subband | Subband differential CQI for the second TB of all even subbands with increasing order of subband number, as in Tables 6.3.1.1.2-3/4/5, if cqi-FormatIndicator = subbandCQI and if reported<br>PMI subband information fields $X_2$ of all even subbands with increasing order of subband number, from left to right as in Tables 6.3.1.1.2-1/2, or codebook index for 2 antenna |
|---|---|

TABLE 6.3.1.1.2-11-continued

Mapping order of CSI fields of one CSI report, CSI part 2 subband,
pmi-FormatIndicator = subbandPMI or cqi-FormatIndicator = subbandCQI ports according to Subclause 5.2.2.2.1 in [6, TS38.214] of all even subbands with increasing order of subband number, if pmi-FormatIndicator = subbandPMI and if reported
Subband differential CQI for the second TB of all odd subbands with increasing order of subband number, as in Tables 6.3.1.1.2-3/4/5, if cqi-FormatIndicator = subbandCQI and if reported
PMI subband information fields $X_2$ of all odd subbands with increasing order of subband number, from left to right as in Tables 6.3.1.1.2-1/2, or codebook index for 2 antenna ports according to Subclause 5.2.2.2.1 in [6, TS38.214] of all odd subbands with increasing order of subband number, if pmi-FormatIndicator = subbandPMI and if reported Note:
Subbands for given CSI report n indicated by the higher layer parameter csi-ReportingBand are numbered continuously in the increasing order with the lowest subband of csi-ReportingBand as subband 0.

If none of the CSI reports for transmission on a PUCCH is of two parts, the CSI fields of all CSI reports, in the order from upper part to lower part in Table 6.3.1.1.2-12, are mapped to the UCI bit sequence $a_0, a_1, a_2, a_3, \ldots, a_{A-1}$ starting with $a_0$. The most significant bit of each field is mapped to the lowest order information bit for that field, e.g. the most significant bit of the first field is mapped to $a_0$.

TABLE 6.3.1.1.2-12

Mapping order of CSI reports to UCI bit sequence $a_0$, $a_1, a_2, a_3, \ldots, a_{A-1}$, without two-part CSI report(s)

| UCI bit sequence | CSI report number |
|---|---|
| $a_0$ | CSI report #1 |
| $a_1$ | as in Table 6.3.1.1.2-7/8 |
| $a_2$ | CSI report #2 |
| $a_3$ | as in Table 6.3.1.1.2-7/8 |
| . | ... |
| . | CSI report #n |
| . | as in Table 6.3.1.1.2-7/8 |
| $a_{A-1}$ | |

If at least one of the CSI reports for transmission on a PUCCH is of two parts, two UCI bit sequences are generated, $a_0^{(1)}, a_1^{(1)}, a_2^{(1)}, a_3^{(1)}, \ldots, a_{A^{(1)}-1}^{(1)}$ and $a_0^{(2)}, a_1^{(2)}, a_2^{(2)}, a_3^{(2)}, \ldots a_{A^{(2)}-1}^{(2)}$. The CSI fields of all CSI reports, in the order from upper part to lower part in Table 6.3.1.1.2-13, are mapped to the UCI bit sequence $a_0^{(1)}, a_1^{(1)}, a_2^{(1)}, a_3^{(1)}, \ldots, a_{A^{(1)}-1}^{(1)}$ starting with $a_0^{(1)}$. The most significant bit of each field is mapped to the lowest order information bit for that field, e.g. the most significant bit of the first field is mapped to $a_0^{(2)}$. The CSI fields of all CSI reports, in the order from upper part to lower part in Table 6.3.1.1.2-14, are mapped to the UCI bit sequence $a_0^{(2)}, a_1^{(2)}, a_2^{(2)}, a_3^{(2)}, \ldots a_{A^{(2)}-1}^{(2)}$ starting with $a_0^{(2)}$. The most significant bit of each field is mapped to the lowest order information bit for that field, e.g. the most significant bit of the first field is mapped to $a_0^{(2)}$. If the length of UCI bit sequence $a_0^{(2)}, a_1^{(2)}, a_2^{(2)}, a_3^{(2)}, \ldots a_{A^{(2)}-1}^{(2)}$ is less than 3 bits, zeros shall be appended to the UCI bit sequence until its length equals 3.

TABLE 6.3.1.1.2-13

Mapping order of CSI reports to UCI bit sequence $a_0^{(1)}, a_1^{(1)}, a_2^{(1)}, a_3^{(1)}, \ldots, a_{A^{(1)}-1}^{(1)}$, with two-part CSI report(s)

| UCI bit sequence | CSI report number |
|---|---|
| $a_0^{(1)}$ | CSI report #1 if CSI report #1 is not of two parts, or |
| $a_1^{(1)}$ | CSI report #1, CSI part 1, if CSI report #1 is of two |

TABLE 6.3.1.1.2-13-continued

Mapping order of CSI reports to UCI bit sequence $a_0^{(1)}, a_1^{(1)}, a_2^{(1)}, a_3^{(1)}, \ldots, a_{A^{(1)}-1}^{(1)}$, with two-part CSI report(s)

| UCI bit sequence | CSI report number |
|---|---|
| $a_2^{(1)}$ | parts, as in Table 6.3.1.1.2-7/8/9 |
| $a_3^{(1)}$ | CSI report #2 if CSI report #2 is not of two parts, or |
| . | CSI report #2, CSI part 1, if CSI report #2 is of two parts, as in Table 6.3.1.1.2-7/8/9 |
| . | ... |
| $a_{A^{(1)}-1}^{(1)}$ | CSI report #n if CSI report #n is not of two parts, or CSI report #n, CSI part 1, if CSI report #n is of two parts, as in Table 6.3.1.1.2-7/8/9 | where CSI report #1, CSI report #2 . . . CS report #n in Table 6.3.1.1.2-13 correspond to the CSI reports in increasing order of CSI report priority values according to Subclause 5.2.5 of [6, TS38.214].

TABLE 6.3.1.1.2-14

Mapping order of CSI reports to UCI bit sequence $a_0^{(2)}, a_1^{(2)}, a_2^{(2)}, a_3^{(2)}, \ldots, a_{A^{(2)}-1}^{(2)}$, with two-part CSI report(s)

| UCI bit sequence | CSI report number |
|---|---|
| $a_0^{(2)}$ | CSI report #1, CSI part 2 wideband, as in Table 6.3.1.1.2-10 |
| $a_1^{(2)}$ | if CSI part 2 exists for CSI report #1 |
| $a_2^{(2)}$ | CSI report #2, CSI part 2 wideband, as in Table 6.3.1.1.2-10 |
| $a_3^{(2)}$ | if CSI part 2 exists for CSI report #2 |
| . | ... |
| . | CSI report #n, CSI part 2 wideband, as in Table 6.3.1.1.2-10 |
| . | if CSI part 2 exists for CSI report #n |
| $a_{A^{(2)}-1}^{(2)}$ | CSI report #1, CSI part 2 subband, as in Table 6.3.1.1.2-11 if CSI part 2 exists for CSI report #1 |
| | CSI report #2, CSI part 2 subband, as in Table 6.3.1.1.2-11 if CSI part 2 exists for CSI report #2 |
| | ... |
| | CSI report #n, CSI part 2 subband, as in Table 6.3.1.1.2-11 if CSI part 2 exists for CSI report #n | where CSI report #1, CSI report #2, . . . CSI report #n in Table 6.3.1.1.2-14 correspond to the CSI reports in increasing order of CSI report priority values according to Subflause 5.2.5 of [6, TS38.214].

6.3.2.1.2 CSI

The bitwidth for PMI of codebookType=typeI-SinglePanel and codebookType=typeI-MultiPanel is specified in Subclause 6.3.1.1.2.

The bitwidth for RI/LI/CQI/CRI of codebookType=typeI-SinglePanel and codebookType=typeI-MultiPanel is specified in Subclause 6.3.1.1.2.

The bitwidth for PMI of codebookType=typeII is provided in Tables 6.3.2.1.2-1, where the values of $(N_1, N_2)$, $(O_1, O_2)$, $L$, $N_{PSK}$, $M_1$, $M_2$, and $K^{(2)}$ are given by Subclause 5.2.2.2.3 in [6, TS 38.214].

TABLE 6.3.2.1.2-1

PMI of codebookType = typeII

| | Information fields $X_1$ for wideband PMI | | | | | |
|---|---|---|---|---|---|---|
| | $i_{1,1}$ | $i_{1,2}$ | $i_{1,3,1}$ | $i_{1,4,1}$ | $i_{1,3,2}$ | $i_{1,4,2}$ |
| Rank = 1 SBAmp off | $\lceil \log_2 (O_1 O_2) \rceil$ | $\left\lceil \log_2 \binom{N_1 N_2}{L} \right\rceil$ | $\lceil \log_2 (2L) \rceil$ | $3(2L - 1)$ | N/A | N/A |
| Rank = 2 SBAmp off | $\lceil \log_2 (O_1 O_2) \rceil$ | $\left\lceil \log_2 \binom{N_1 N_2}{L} \right\rceil$ | $\lceil \log_2 (2L) \rceil$ | $3(2L - 1)$ | $\lceil \log_2 (2L) \rceil$ | $3(2L - 1$ |
| Rank = 1 SBAmp on | $\lceil \log_2 (O_1 O_2) \rceil$ | $\left\lceil \log_2 \binom{N_1 N_2}{L} \right\rceil$ | $\lceil \log_2 (2L) \rceil$ | $3(2L - 1)$ | N/A | N/A |
| Rank = 2 SBAmp on | $\lceil \log_2 (O_1 O_2) \rceil$ | $\left\lceil \log_2 \binom{N_1 N_2}{L} \right\rceil$ | $\lceil \log_2 (2L) \rceil$ | $3(2L - 1)$ | $\lceil \log_2 (2L) \rceil$ | $3(2L - 1$ |

| | Information fields $X_2$ for wideband PMI or per subband PMI | | | |
|---|---|---|---|---|
| | $i_{2,1,1}$ | $i_{2,1,1}$ | $i_{2,1,1}$ | $i_{2,1,1}$ |
| Rank = 1 SBAmp off | $(M_1 - 1) \cdot \log_2 N_{PSK}$ | N/A | N/A | N/A |
| Rank = 2 SBAmp off | $(M_1 - 1) \cdot \log_2 N_{PSK}$ | $(M_2 - 1) \cdot \log_2 N_{PSK}$ | N/A | N/A |
| Rank = 1 SBAmp on | $\min(M_1, K^{(2)}) \cdot \log_2 N_{PSK} - \log_2 N_{PSK} + 2 \cdot (M_1 - \min(M_1, K^{(2)}))$ | N/A | $\min(M_1, K^{(2)})-1$ | N/A |
| Rank = 2 SBAmp on | $\min(M_1, K^{(2)}) \cdot \log_2 N_{PSK} - \log_2 N_{PSK} + 2 \cdot (M_1 - \min(M_1, K^{(2)}))$ | $\min(M_2, K^{(2)}) \cdot \log_2 N_{PSK} - \log_2 N_{PSK} + 2 \cdot (M_2 - \min(M_2, K^{(2)}))$ | $\min(M_1, K^{(2)})-1$ | $\min(M_2, K^{(2)})-1$ |

The bitwidth for PMI of codebookType=typeII-PortSelection is provided in Tables 6.3.2.1.2-2, where the values of $P_{CSI-RS}$, $d$, $L$, $N_{PSK}$, $M_1$, $M_2$, and $K^{(2)}$ are given by Subclause 5.2.2.2.4 in [6, TS 38.214].

TABLE 6.3.2.1.2-2

PMI of codebookType = typeII-PortSelection

| | Information fields $X_1$ for wideband PMI | | | | | Information fields $X_2$ for wideband PMI or per subband PMI | | | |
|---|---|---|---|---|---|---|---|---|---|
| | $i_{1,1}$ | $i_{1,3,1}$ | $i_{1,4,1}$ | $i_{1,3,2}$ | $i_{1,4,2}$ | $i_{2,1,1}$ | $i_{2,1,2}$ | $i_{2,2,1}$ | $i_{2,2,2}$ |
| Rank = 1 SBAmp off | $\left\lceil \log_2 \frac{P_{CSI-RS}}{2d} \right\rceil$ | $\lceil \log_2 (2L) \rceil$ | $3(2L - 1)$ | N/A | N/A | $(M_1 - 1) \cdot \log_2 N_{PSK}$ | N/A | N/A | N/A |
| Rank = 2 SBAmp off | $\left\lceil \log_2 \frac{P_{CSI-RS}}{2d} \right\rceil$ | $\lceil \log_2 (2L) \rceil$ | $3(2L - 1)$ | $\lceil \log_2 (2L) \rceil$ | $3(2L - 1)$ | $(M_1 - 1) \cdot \log_2 N_{PSK}$ | $(M_2 - 1) \cdot \log_2 N_{PSK}$ | N/A | N/A |
| Rank = 1 SBAmp on | $\left\lceil \log_2 \frac{P_{CSI-RS}}{2d} \right\rceil$ | $\lceil \log_2 (2L) \rceil$ | $3(2L - 1)$ | N/A | N/A | $\min(M_1, K^{(2)}) \cdot \log_2 N_{PSK} - \log_2 N_{PSK} + 2 \cdot (M_1 - \min(M_1, K^{(2)}))$ | N/A | $\min(M_1, K^{(2)})-1$ | N/A |
| Rank = 2 SBAmp on | $\left\lceil \log_2 \frac{P_{CSI-RS}}{2d} \right\rceil$ | $\lceil \log_2 (2L) \rceil$ | $3(2L - 1)$ | $\lceil \log_2 (2L) \rceil$ | $3(2L - 1)$ | $\min(M_1, K^{(2)}) \cdot \log_2 N_{PSK} - \log_2 N_{PSK} + 2 \cdot (M_1 - \min(M_1, K^{(2)}))$ | $\min(M_2, K^{(2)}) \cdot \log_2 N_{PSK} - \log_2 N_{PSK} + 2 \cdot (M_2 - \min(M_2, K^{(2)}))$ | $\min(M_1, K^{(2)})-1$ | $\min(M_2, K^{(2)})-1$ |

For CSI on PUSCH, two UCI bit sequences are generated, $a_0^{(1)}, a_1^{(1)}, a_2^{(1)}, a_3^{(1)}, \ldots, a_{A^{(1)}-1}^{(1)}$ and $a_0^{(2)}, a_1^{(2)}, a_2^{(2)}, a_3^{(2)}, \ldots, a_{A^{(2)}-1}^{(2)}$. The CSI fields of all CSI reports, in the order from upper part to lower part in Table 6.3.2.1.2-6, are mapped to the UCI bit sequence $a_0^{(1)}, a_1^{(1)}, a_2^{(1)}, a_3^{(1)}, \ldots, a_{A^{(1)}-1}^{(1)}$ starting with is $a_0^{(1)}$. The CSI fields of all CSI reports, in the order from upper part to lower part in Table 6.3.2.1.2-7, are mapped to the UCI bit sequence $a_0^{(2)}, a_1^{(2)}, a_2^{(2)}, a_3^{(2)}, \ldots, a_{A^{(2)}-1}^{(2)}$ starting with $a_0^{(2)}$.

TABLE 6.3.2.1.2-3

Mapping order of CSI fields of one CSI report, CSI part 1

| CSI report number | CSI fields |
|---|---|
| CSI report #n CSI part 1 | CRI or SSBRI as in Tables 6.3.1.1.2-3/4/6, if reported<br>Rank Indicator as in Tables 6.3.1.1.2-3/4/5, if reported<br>Wideband CQI for the first TB as in Tables 6.3.1.1.2-3/4/5, if reported<br>Subband differential CQI for the first TB with increasing order of subband number as in Tables 6.3.1.1.2-3/4/5, if reported<br>Indicator of the number of non-zero wideband amplitude coefficients $M_l$ for layer l-0 as in Table 6.3.1.1.2-5, if reported<br>Indicator of the number of non-zero wideband amplitude coefficients $M_l$ for layer 1 as in Table 6.3.1.1.2-5, if 2-layer PMI reporting is allowed according to the rank restriction in Subclause 5.2.2.2.2 [6, TS 38.214] and if reported<br>RSRP as in Table 6.3.1.1.2-6, if reported<br>Differential RSRP as in Table 6.3.1.1.2-6, if reported |

Note:
Subbands for given CSI report n indicated by the higher layer parameter csi-ReportingBand are numbered continuously in the increasing order with the lowest subband of csi-ReportingBand as subband 0.

TABLE 6.3.2.1.2-4

Mapping order of CSI fields of one CSI report, CSI part 2 wideband

| CSI report number | CSI fields |
|---|---|
| CSI report #n CSI part 2 wideband | Wideband CQI for the second TB as in Tables 6.3.1.1.2-3/4/5, if present and reported<br>Layer Indicator as in Tables 6.3.1.1.2-3/4/5, if reported<br>PMI wideband information fields $X_1$, from left to right as in Tables 6.3.1.1.2-1/2 or 6.3.2.1.2-1/2, if reported<br>PMI wideband information fields $X_2$, from left to right as in Tables 6.3.1.1.2-1/2 or 6.3.2.1.2-1/2, or codebook index for 2 antenna ports according to Subclause 5.2.2.2.1 in [6, TS38.214], if pmi-FormatIndicator = widebandPMI and if reported |

TABLE 6.3.2.1.2-5

Mapping order of CSI fields of one CSI report, CSI part 2 subband

| CSI report #n Part 2 subband | Subband differential CQI for the second TB of all even subbands with increasing order of subband number, as in Tables 6.3.1.1.2-3/4/5, if cqi-FormatIndicator = subbandCQI and if reported<br>PMI subband information fields $X_2$ of all even subbands with increasing order of subband number, from left to right as in Tables 6.3.1.1.2-1/2 or 6.3.2.1.2-1/2, or codebook index for 2 antenna ports according to Subclause 5.2.2.2.1 in [6, TS38.214] of all even subbands with increasing order of subband number, if pmi-FormatIndicator = subbandPMI and if reported<br>Subband differential CQI for the second TB of all odd subbands with increasing order of subband number, as in Tables 6.3.1.1.2-3/4/5, if cqi-FormatIndicator = subbandCQI and if reported<br>PMI subband information fields $X_2$ of all odd subbands with increasing order of subband number, from left to right as in Tables 6.3.1.1.2-1/2 or 6.3.2.1.2-1/2, or codebook index for 2 antenna ports according to Subclause 5.2.2.2.1 in [6, TS38.214] of all odd subbands with increasing order of subband number, if pmi-FormatIndicator = subbandPMI and if reported |
|---|---|

Note:
Subbands for given CSI report n indicated by the higher layer parameter csi-ReportingBand are numbered continuously in the increasing order with the lowest subband of csi-ReportingBand as subband 0.

TABLE 6.3.2.1.2-6

Mapping order of CSI reports to UCI bit sequence $a_0^{(1)}$, $a_1^{(1)}$, $a_2^{(1)}$, $a_3^{(1)}$, . . . , $a_{A^{(1)}-1}^{(1)}$, with two-part CSI report(s)

| UCI bit sequence | CSI report number |
|---|---|
| $a_0^{(1)}$ | CSI part 1 of CSI report #1 as in Table 6.3.2.1.2-3 |
| $a_1^{(1)}$ | CSI part 1 of CSI report #2 as in Table 6.3.2.1.2-3 |
| $a_2^{(1)}$ | . . . |
| $a_3^{(1)}$ | CSI part 1 of CSI report #n as in Table 6.3.2.1.2-3 |
| . | |
| . | |
| . | |
| $a_{A^{(1)}-1}^{(1)}$ | |

TABLE 6.3.2.1.2-7

Mapping order of CSI reports to UCI bit sequence $a_0^{(2)}$, $a_1^{(2)}$, $a_2^{(2)}$, $a_3^{(2)}$, . . . , $a_{A^{(2)}-1}^{(2)}$, with two-part CSI report(s)

| UCI bit sequence | CSI report number |
|---|---|
| $a_0^{(2)}$ | CSI report #1, CSI part 2 wideband, as in Table 6.3.2.1.2-4 |
| $a_1^{(2)}$ | if CSI part 2 exists for CSI report #1 |
| $a_2^{(2)}$ | CSI report #2, CSI part 2 wideband, as in Table 6.3.2.1.2-4 |
| $a_3^{(2)}$ | if CSI part 2 exists for CSI report #2 |
| . | . . . |
| . | CSI report #n, CSI part 2 wideband, as in Table 6.3.2.1.2-4 |
| . | if CSI part 2 exists for CSI report #n |
| $a_{A^{(2)}-1}^{(2)}$ | CSI report #1, CSI part 2 subband, as in Table 6.3.2.1.2-5 |
| | if CSI part 2 exists for CSI report #1 |
| | CSI report #2, CSI part 2 subband, as in Table 6.3.2.1.2-5 |
| | if CSI part 2 exists for CSI report #2 |
| | . . . |
| | CSI report #n, CSI part 2 subband, as in Table 6.3.2.1.2-5 |
| | if CSI part 2 exists for CSI report #n | where CSI report #1, CSI report #2, . . . , CSI report #n in Table 6.3.2.1.2-7 correspond to the CSI reports in increasing order of CSI report priority values according to Subclause 5.2.5 of [6, TS38.214].

Figure 5:
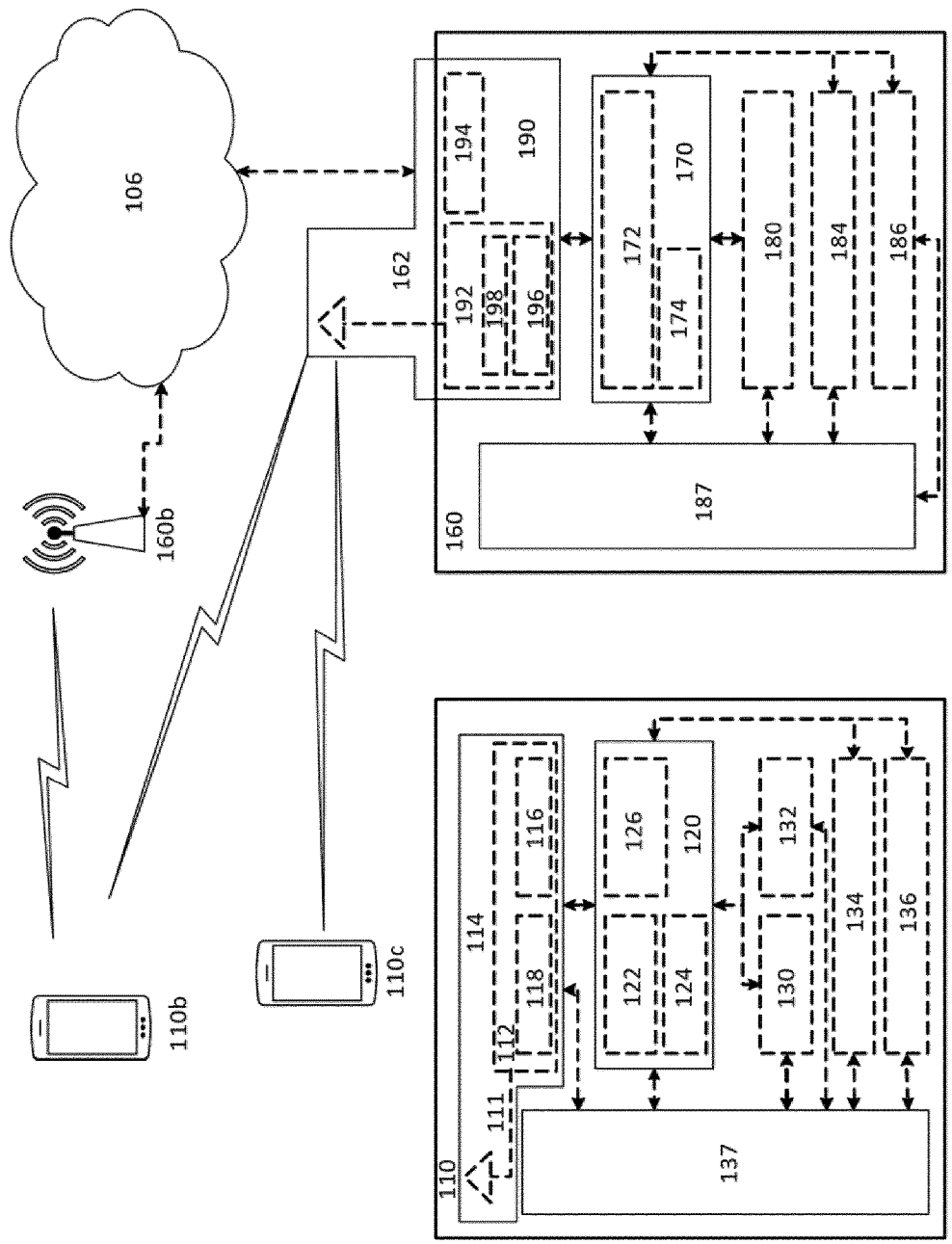
FIG. 5 illustrates an example wireless network, in accordance with certain examples.

FIG. 5 illustrates a wireless network in accordance with some examples. Although the subject matter described herein may be implemented in any appropriate type of system using any suitable components, the examples disclosed herein are described in relation to a wireless network, such as the example wireless network illustrated in FIG. 5. For simplicity, the wireless network of FIG. 5 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some examples, the wireless network may be configured to operate according to specific standards or other types of predefined rules or procedures. Thus, particular examples of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different examples, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other examples may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some examples, network node 160 may be configured to support multiple radio access technologies (RATs). In such examples, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some examples, processing circuitry 170 may include a system on a chip (SOC).

In some examples, processing circuitry 170 may include one or more of radio frequency (RF) transceiver circuitry 172 and baseband processing circuitry 174. In some examples, radio frequency (RF) transceiver circuitry 172 and baseband processing circuitry 174 may be on separate chips (or sets of chips), boards, or units, such as radio units and digital units. In alternative examples, part or all of RF transceiver circuitry 172 and baseband processing circuitry 174 may be on the same chip or set of chips, boards, or units In certain examples, some or all of the functionality described herein as being provided by a network node, base station, eNB or other such network device may be performed by processing circuitry 170 executing instructions stored on device readable medium 180 or memory within processing circuitry 170. In alternative examples, some or all of the functionality may be provided by processing circuitry 170 without executing instructions stored on a separate or discrete device readable medium, such as in a hard-wired manner. In any of those examples, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some examples, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain examples a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other examples, the interface may comprise different components and/or different combinations of components.

In certain alternative examples, network node 160 may not include separate radio front end circuitry 192, instead, processing circuitry 170 may comprise radio front end circuitry and may be connected to antenna 162 without separate radio front end circuitry 192. Similarly, in some examples, all or some of RF transceiver circuitry 172 may be considered a part of interface 190. In still other examples, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some examples, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain examples, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative examples of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some examples, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative examples, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some examples, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some examples, wireless device 110 may not include separate radio front end circuitry 112; rather, processing circuitry 120 may comprise radio front end circuitry and may be connected to antenna 111. Similarly, in some examples, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other examples, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other examples, the processing circuitry may comprise different components and/or different combinations of components. In certain examples processing circuitry 120 of wireless device 110 may comprise a SOC. In some examples, RF transceiver circuitry 122, baseband processing circuitry 124, and application processing circuitry 126 may be on separate chips or sets of chips. In alternative examples, part or all of baseband processing circuitry 124 and application processing circuitry 126 may be combined into one chip or set of chips, and RF transceiver circuitry 122 may be on a separate chip or set of chips. In still alternative examples, part or all of RF transceiver circuitry 122 and baseband processing circuitry 124 may be on the same chip or set of chips, and application processing circuitry 126 may be on a separate chip or set of chips. In yet other alternative examples, part or all of RF transceiver circuitry 122, baseband processing circuitry 124, and application processing circuitry 126 may be combined in the same chip or set of chips. In some examples, RF transceiver circuitry 122 may be a part of interface 114. RF transceiver circuitry 122 may condition RF signals for processing circuitry 120.

In certain examples, some or all of the functionality described herein as being performed by a wireless device may be provided by processing circuitry 120 executing instructions stored on device readable medium 130, which in certain examples may be a computer-readable storage medium. In alternative examples, some or all of the functionality may be provided by processing circuitry 120 without executing instructions stored on a separate or discrete device readable storage medium, such as in a hard-wired manner. In any of those particular examples, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some examples, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the example and/or scenario.

Power source 136 may, in some examples, be in the form of a battery or battery pack. Other types of power sources, such as an external power source (e.g., an electricity outlet), photovoltaic devices or power cells, may also be used, wireless device 110 may further comprise power circuitry 137 for delivering power from power source 136 to the various parts of wireless device 110 which need power from power source 136 to carry out any functionality described or indicated herein. Power circuitry 137 may in certain examples comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain examples be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 6:
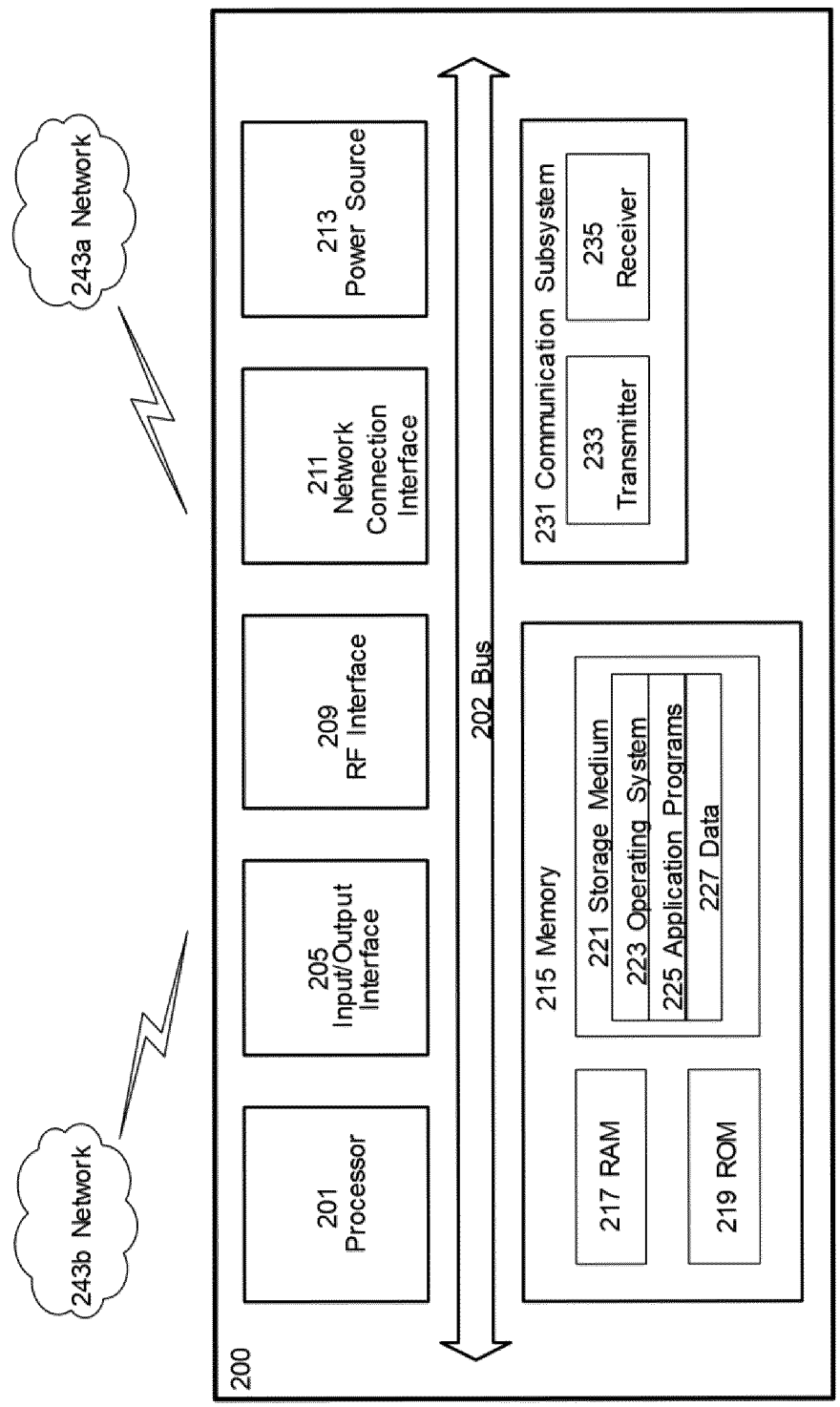
FIG. 6 illustrates an example user equipment, in accordance with certain examples.

FIG. 6 illustrates one example of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 6 is a UE, the components discussed herein are equally applicable to a wireless device, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other examples, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted example, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated example, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
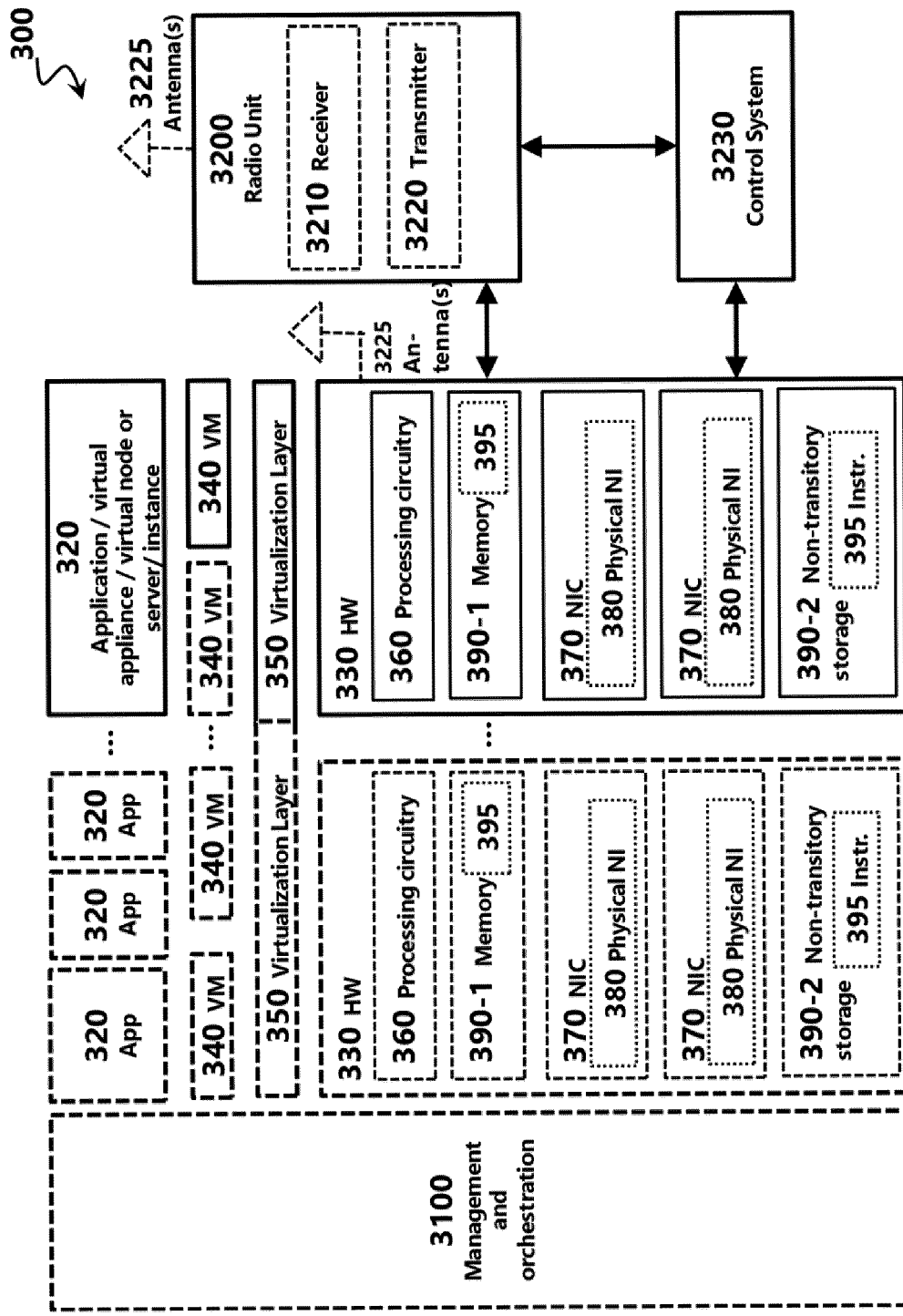
FIG. 7 illustrates an example virtualization environment, in accordance with certain examples.

FIG. 7 is a schematic block diagram illustrating a virtualization environment 300 in which functions implemented by some examples may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some examples, some or all of the functions described herein may be implemented as virtual components executed by one or more virtual machines implemented in one or more virtual environments 300 hosted by one or more of hardware nodes 330. Further, in examples in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the examples disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some examples described herein.

Virtual machines 340, comprise virtual processing, virtual memory, virtual networking or interface and virtual storage, and may be run by a corresponding virtualization layer 350 or hypervisor. Different examples of the instance of virtual appliance 320 may be implemented on one or more of virtual machines 340, and the implementations may be made in different ways. During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340. As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data centre or customer premise equipment (CPE)) where many hardware nodes work together and are managed via management and orchestration (MANO) 3100, which, among others, oversees lifecycle management of applications 320. Virtualization of the hardware is in some contexts referred to as network function virtualization (NFV). NFV may be used to consolidate many network equipment types onto industry standard high volume server hardware, physical switches, and physical storage, which can be located in data centres, and customer premise equipment. In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE). Still in the context of NFV, Virtual Network Function (VNF) is responsible for handling specific network functions that run in one or more virtual machines 340 on top of hardware networking infrastructure 330 and corresponds to application 320 in FIG. 7. In some examples, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station. In some examples, some signalling can be effected with the use of control system 3230 which may alternatively be used for communication between the hardware nodes 330 and radio units 3200.

Figure 8:
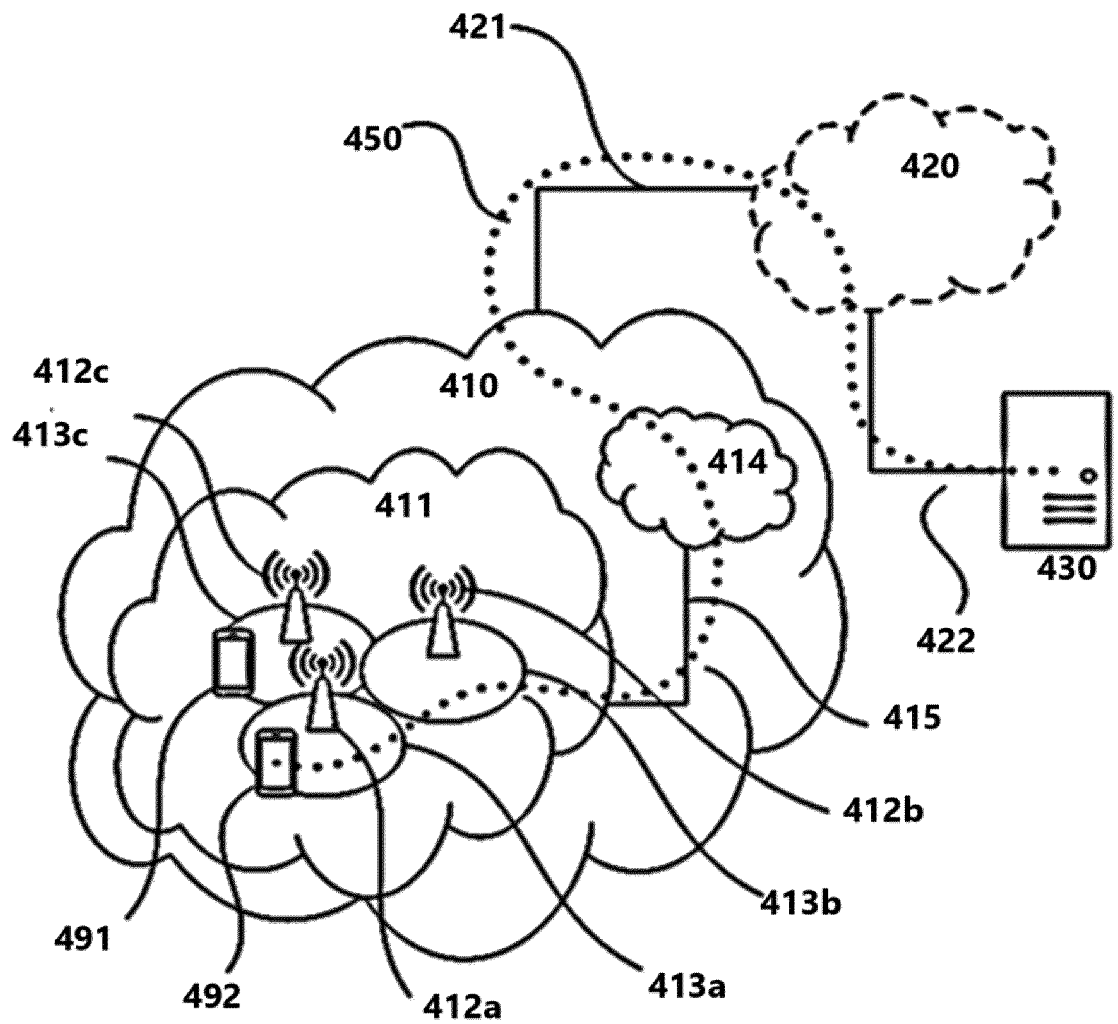
FIG. 8 illustrate an example telecommunication network connected via an intermediate network to a host computer, in accordance with certain examples.

With reference to FIG. 8, in accordance with an example, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed examples are equally applicable to a situation where a sole UE is in the coverage area or where a sole UE is connecting to the corresponding base station 412. Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an example, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the example shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides. It is noted that host computer 510, base station 520 and UE 530 illustrated in FIG. 9 may be similar or identical to host computer 430, one of base stations 412a, 412b, 412c and one of UEs 491, 492 of FIG. 8, respectively. This is to say, the inner workings of these entities may be as shown in FIG. 9 and independently, the surrounding network topology may be that of FIG. 8.

Figure 9:
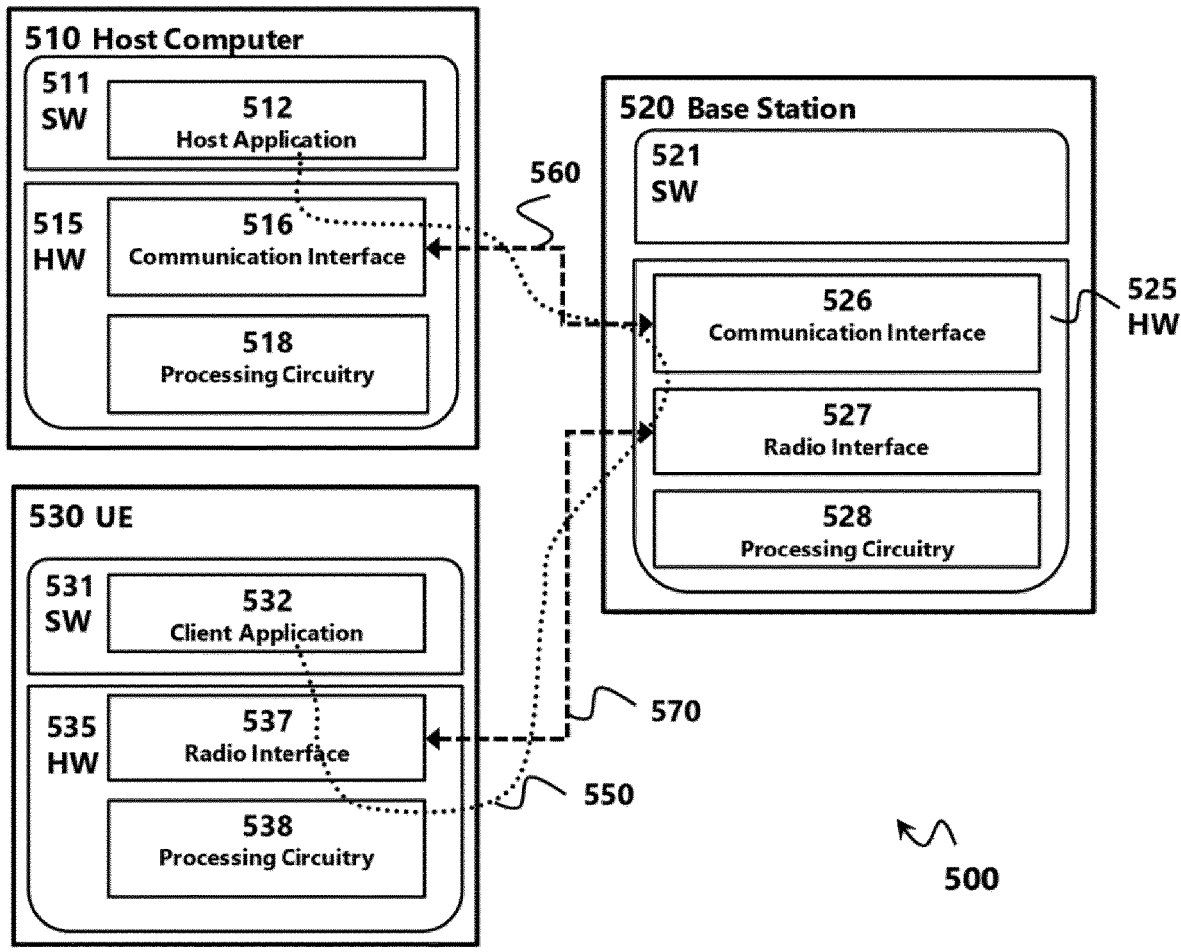
FIG. 9 illustrates an example host computer communicating via a base station with a user equipment over a partially wireless connection, in accordance with certain examples.

In FIG. 9, OTT connection 550 has been drawn abstractiy to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the examples described throughout this disclosure. One or more of the various examples improve the performance of OTT services provided to UE 530 using OTT connection 550, in which wireless connection 570 forms the last segment. More precisely, the teachings of these examples may improve the signaling overhead.

A measurement procedure may be provided for the purpose of monitoring data rate, latency and other factors on which the one or more examples improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In examples, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain examples, measurements may involve proprietary UE signaling facilitating host computer 510's measurements of throughput, propagation times, latency and the like.

The measurements may be implemented in that software 511 and 531 causes messages to be transmitted, in particular empty or 'dummy' messages, using OTT connection 550 while it monitors propagation times, errors etc.

Figures 10, 11:
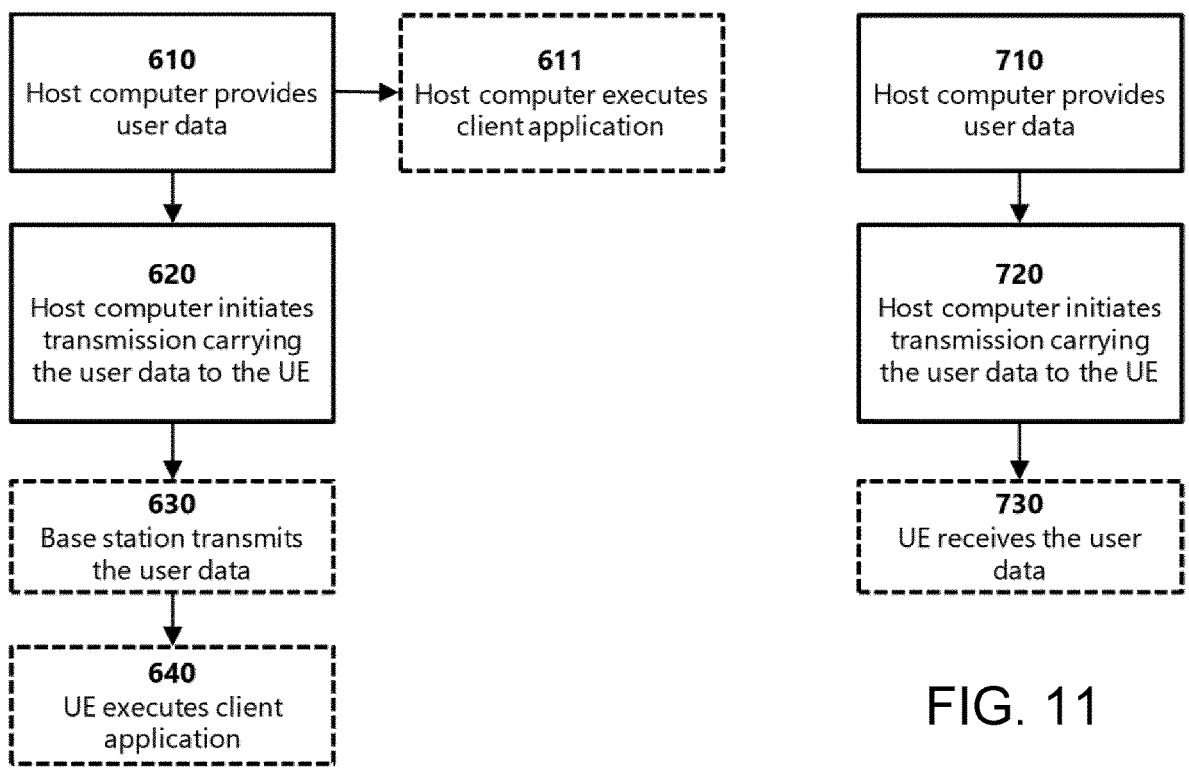
FIG. 10 is a flowchart illustrating an example method implemented in a communication system, in accordance certain examples.
FIG. 11 is a flowchart illustrating a second example method implemented in a communication system, in accordance with certain examples.

FIG. 10 is a flowchart illustrating a method implemented in a communication system, in accordance with one example. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the examples described throughout this disclosure. In step 640 (which may also be optional), the UE executes a client application associated with the host application executed by the host computer.

FIG. 11 is a flowchart illustrating a method implemented in a communication system, in accordance with one example. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the examples described throughout this disclosure. In step 730 (which may be optional), the UE receives the user data carried in the transmission.

Figures 12, 13:
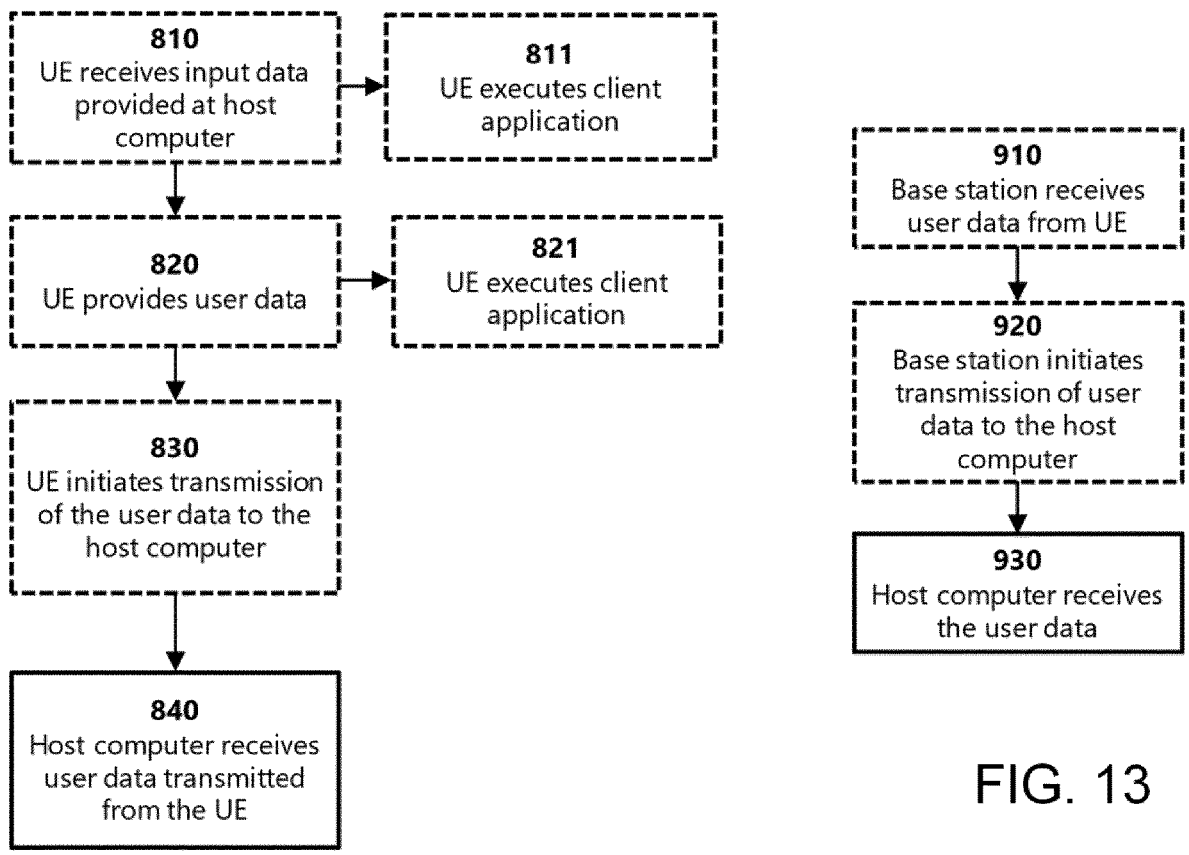
FIG. 12 is a flowchart illustrating a third method implemented in a communication system, in accordance with certain examples.
FIG. 13 is a flowchart illustrating a fourth method implemented in a communication system, in accordance with certain examples.

FIG. 12 is a flowchart illustrating a method implemented in a communication system, in accordance with one example. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the examples described throughout this disclosure.

FIG. 13 is a flowchart illustrating a method implemented in a communication system, in accordance with one example. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the examples described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 14:
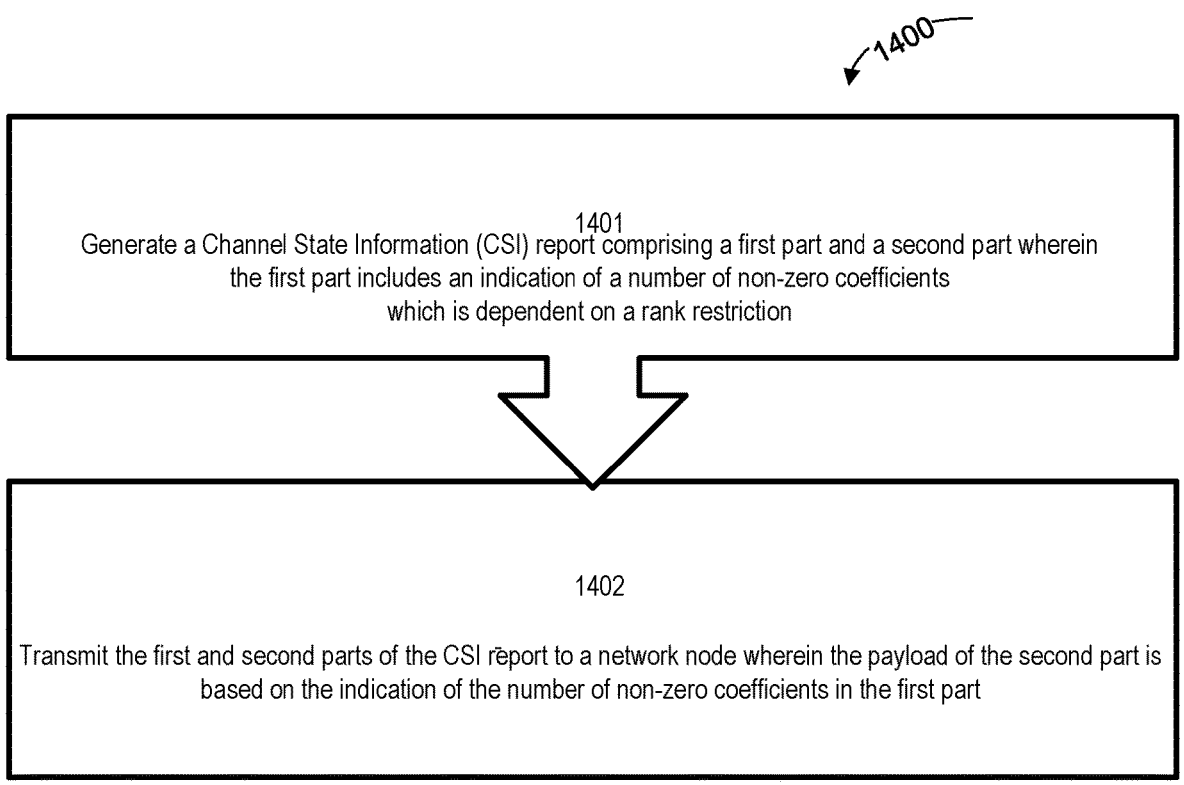
FIG. 14 is a flowchart illustrating an example of a method performed by a wireless device, in accordance with certain examples.

FIG. 14 illustrates an example of a method 1400 performed by a wireless device (e.g., a UE) for indicating a number of non-zero coefficients for multibeam or multilayer precoder based CSI feedback, for example NR Type II CSI. The method begins at step 1401, where the wireless device generates a CSI report, the CSI report comprising a first part, e.g. CSI Part 1 and a second part, e,g, CSI Part 2. In some particular examples the first part includes an indication of a number of non-zero coefficients, for example wideband amplitude coefficients. In further examples the indication is dependent on a rank restriction. In a particular example the payload size of the indication is dependent on a rank restriction. At step 1402, the wireless device transmits the CSI report to a network node, wherein one or more of a payload of the CSI Part 2 and a payload size of the CSI Part 2 is based on the number of non-zero coefficients indicated in the CSI part 1. In other words, indicating a number of non-zero coefficients in the CSI part 1, facilitates a determination of one or more of a payload of the CSI Part 2 and a payload size of the CSI Part 2. In some examples the rank is explicitly indicated and in other examples the rank is implicitly indicated. Either way the rank and the number of non-zero coefficients can facilitate a determination of one or more of a payload of the CSI Part 2 and a payload size of the CSI Part 2.

In certain examples, the CSI Part I may indicate the number of non-zero coefficients for each layer. In certain examples, the number of non-zero coefficients for each layer may be indicated with a layer-wise separate indicator in CSI Part 1.

In certain examples, the indication of the number of non-zero coefficients may have a bitwidth of $$\left\lceil \log_2 \max_R K_0(R, l) \right\rceil.$$

In certain examples, the payload size of the indication of the number of non-zero coefficients may be constant irrespective of a rank selection by the wireless device.

In certain examples, a payload size of the indication of the number of non-zero coefficients may be based on one or more of: allowable ranks the wireless device is allowed to select; and a maximum rank the wireless device is allowed to select. In certain examples, the CSI Part 1 may include an explicit rank indication indicating the rank. In certain examples, the CSI Part 1 may indicate the rank implicitly based on the indication of the number of non-zero coefficients. In certain examples, an indication of the rank and an indication of the number of non-zero coefficients may be jointly encoded into a single index. In certain examples, the CSI Part I may indicate a total number of non-zero coefficients across all layers. In certain examples, a UCI parameter in CSI Part I may indicate a sum of the non-zero coefficients across all layers. In certain examples, the CSI Part I may include an explicit rank indication.

In certain examples, the method may further comprise obtaining a configuration for a maximum number of non-zero coefficients summed over all layers for a given rank. In certain examples, the method may further comprise determining a maximum number of non-zero coefficients summed over all layers for a given rank. In certain examples, the CSI Part 1 may comprise one or more indicators of a number of non-zero coefficients, the number of non-zero coefficients dependent on a rank restriction. In certain examples, the method may further comprise providing user data and forwarding the user data to a host computer via the transmission to a base station.

Figure 15:
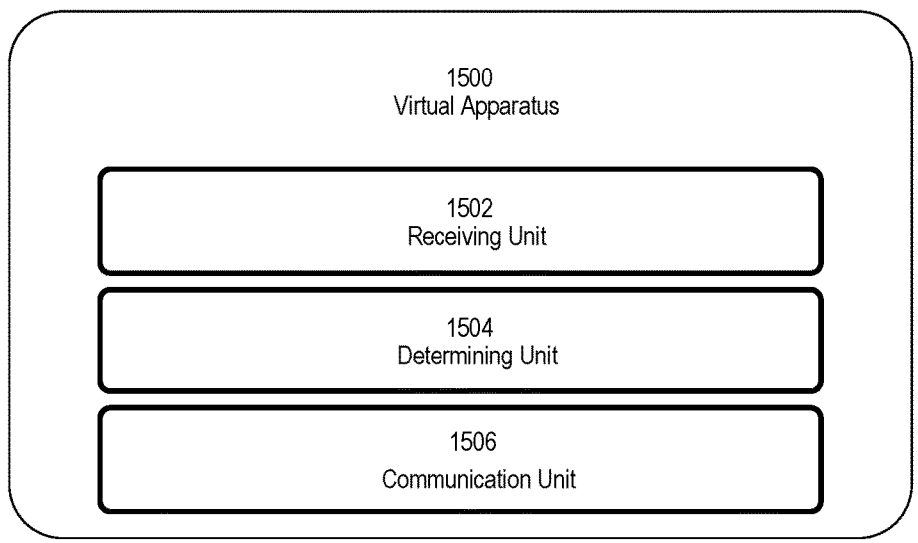
FIG. 15 is a block diagram illustrating an example of a virtual apparatus, in accordance with certain examples.

FIG. 15 illustrates a schematic block diagram of an apparatus 1500 in a wireless network (for example, the wireless network shown in FIG. 5). The apparatus may be implemented in a wireless device (e.g., wireless device 110 shown in FIG. 5). Apparatus 1500 is operable to carry out the example method described with reference to FIG. 14 and possibly any other processes or methods disclosed herein. It is also to be understood that the method of FIG. 14 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several examples. In some implementations, the processing circuitry may be used to cause receiving unit 1502, determining unit 1504, communication unit 1506, and any other suitable units of apparatus 1500 to perform corresponding functions according one or more examples of the present disclosure.

In certain examples, apparatus 1500 may be a UE. As illustrated in FIG. 15, apparatus 1500 includes receiving unit 1502, determining unit 1504, and communication unit 1506. Receiving unit 1502 may be configured to perform the receiving functions of apparatus 1500. For example, receiving unit 1502 may be configured to obtain a configuration for a maximum number of non-zero coefficients summed over all layers for a given rank. Receiving unit 1502 may receive any suitable information (e.g., from a wireless device or another network node). Receiving unit 1502 may include a receiver and/or a transceiver, such as RF transceiver circuitry 122 described above in relation to FIG. 5. Receiving unit 1502 may include circuitry configured to receive messages and/or signals (wireless or wired). In particular examples, receiving unit 1502 may communicate received messages and/or signals to determining unit 1504 and/or any other suitable unit of apparatus 1500. The functions of receiving unit 1502 may, in certain examples, be performed in one or more distinct units.

Determining unit 1504 may perform the processing functions of apparatus 1500. For example, determining unit 1504 may be configured to generate a CSI report, the CSI report comprising a CSI Part 1 and a CSI Part 2. In some examples the CSI Part 1 comprises an indication of a number of non-zero coefficients. In further examples the indication of the number of non-zero coefficients is dependent on a rank restriction of the wireless device. In further examples the payload size of the indication is dependent on a rank restriction of the wireless device. In some examples the CSI report is transmitted, wherein one or more of a payload of the CSI Part 2 and a payload size of the CSI Part 2 is based on the number of non-zero coefficients indicated in the CSI part 1. In other words, indicating a number of non-zero coefficients in the CSI part 1, facilitates a determination of one or more of a payload of the CSI Part 2 and a payload size of the CSI Part 2. In some examples the rank is explicitly indicated and in other examples the rank is implicitly indicated. Either way the rank and the number of non-zero coefficients can facilitate a determination of one or more of a payload of the CSI Part 2 and a payload size of the CSI Part 2 In other words, the CSI Part 1 may indicate a rank and a number of non-zero coefficients, the rank and the number of non-zero coefficients facilitating a determination of one or more of a payload of the CSI Part 2 and a payload size of the CSI Part 2. In certain examples, the CSI Part 1 may comprise one or more indicators of a number of non-zero coefficients, the number of non-zero coefficients dependent on a rank restriction. In certain examples, the CSI Part 1 may comprise at least one of an indicator of a number of non-zero coefficients for layer 0, if reported, and an indicator of a number of non-zero coefficients for layer 1. As another example, determining unit 1504 may be configured to determine a maximum number of non-zero coefficients summed over all layers for a given rank. As still another example, determining unit 1504 may be configured to provide user data.

Determining unit 1504 may include or be included in one or more processors, such as processing circuitry 120 described above in relation to FIG. 5. Determining unit 1504 may include analog and/or digital circuitry configured to perform any of the functions of determining unit 1504 and/or processing circuitry 120 described above. The functions of determining unit 1504 may, in certain examples, be performed in one or more distinct units.

Communication unit 1506 may be configured to perform the transmission functions of apparatus 1500. For example, communication unit 1506 may be configured to transmit the CSI report to a network node. As another example, communication unit 1506 may be configured to forward the user data to a host computer via the transmission to a base station.

Communication unit 1506 may transmit messages (e.g., to a wireless device and/or another network node). Communication unit 1506 may include a transmitter and/or a transceiver, such as RF transceiver circuitry 122 described above in relation to FIG. 5. Communication unit 1506 may include circuitry configured to transmit messages and/or signals (e.g., through wireless or wired means). In particular examples, communication unit 1506 may receive messages and/or signals for transmission from determining unit 1504 or any other unit of apparatus 1500. The functions of communication unit 1504 may, in certain examples, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 16:
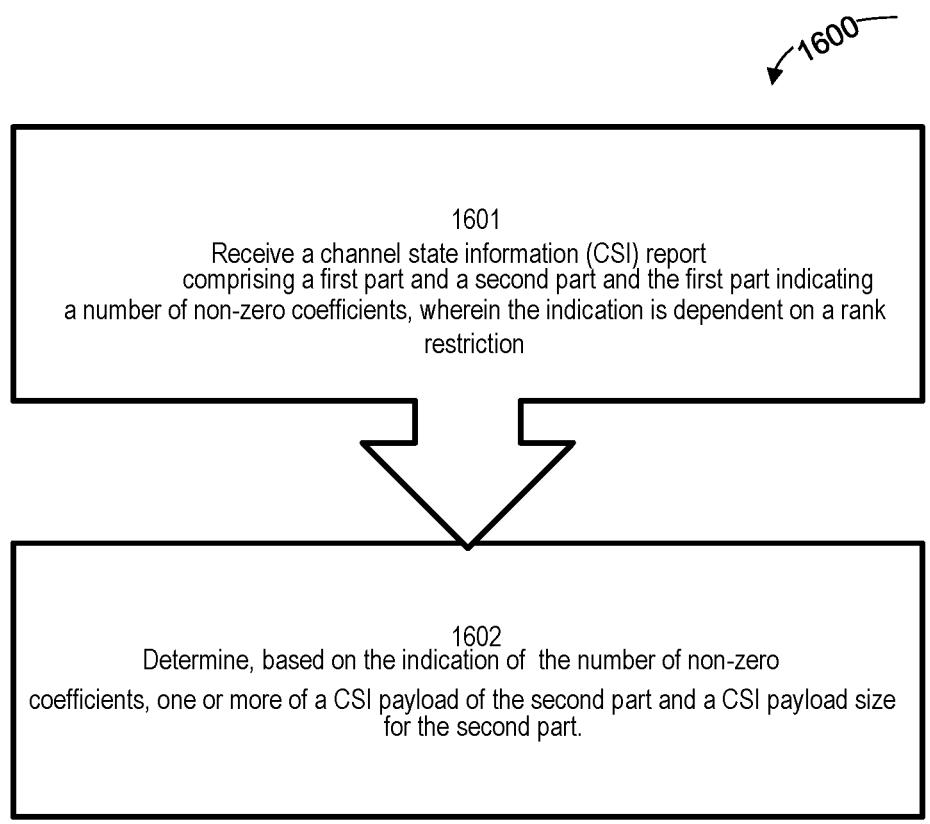
FIG. 16 is a flowchart illustrating an example of a method performed by a network node, in accordance with certain examples.

FIG. 16 is a flow chart of a method 1600 in a network node, in accordance with particular examples. The method begins at step 1601, where the network node receives a CSI report from a wireless device, the CSI report comprising a first part, e.g. a CSI Part 1 and a second part, e.g. a CSI Part 2. In some examples, the CSI Part 1 comprises an indication of a number of non-zero coefficients. In further examples the number of non-zero coefficients is dependent on a rank restriction of the wireless device. In further examples the payload size of the indication of number of non-zero coefficients is dependent on a rank restriction of the wireless device In some examples the CSI Part 1 indicates a rank and a number of non-zero coefficients.

At step 1602, the network node determines, based on the number of non-zero coefficients, one or more of a CSI payload of the CSI Part 2 and a CSI payload size for the CSI Part 2. In some examples the rank is explicitly indicated, in other examples the rank is implicitly indicated. In other examples the network node determines, based on the rank and the number of non-zero coefficients, one or more of a CSI payload of the CSI Part 2 and a CSI payload size for the CSI Part 2.

In certain examples, the CSI Part I may indicate the number of non-zero coefficients for each layer. In certain examples, the number of non-zero coefficients for each layer may be indicated with a layer-wise separate indicator in CSI Part 1. In certain examples, the indication of the number of non-zero coefficients may have a bitwidth of $$\left\lceil \log_2 \max_R K_0(R, l) \right\rceil.$$

In certain examples, a payload size of the indication of the number of non-zero coefficients may be constant irrespective of a rank selection by the wireless device. In certain examples, a payload size of the indication of the number of non-zero coefficients may be based on one or more of: allowable ranks the wireless device is allowed to select; and a maximum rank the wireless device is allowed to select. In certain examples, the CSI Part 1 may include an explicit rank indication indicating the rank. In certain examples, the CSI Part 1 may indicate the rank implicitly based on the indication of the number of non-zero coefficients. In certain examples, an indication of the rank and an indication of the number of non-zero coefficients may be jointly encoded into a single index. In certain examples, the CSI Part I may indicate a total number of non-zero coefficients across all layers. In certain examples, a UCI parameter in CSI Part I may indicate a sum of the non-zero coefficients across all layers. In certain examples, the CSI Part I may include an explicit rank indication. In certain examples, the CSI Part 1 may comprise one or more indicators of a number of non-zero coefficients, the number of non-zero coefficients dependent on a rank restriction. In certain examples, the method may further comprise obtaining user data and forwarding the user data to a host computer or a wireless device.

Figure 17:
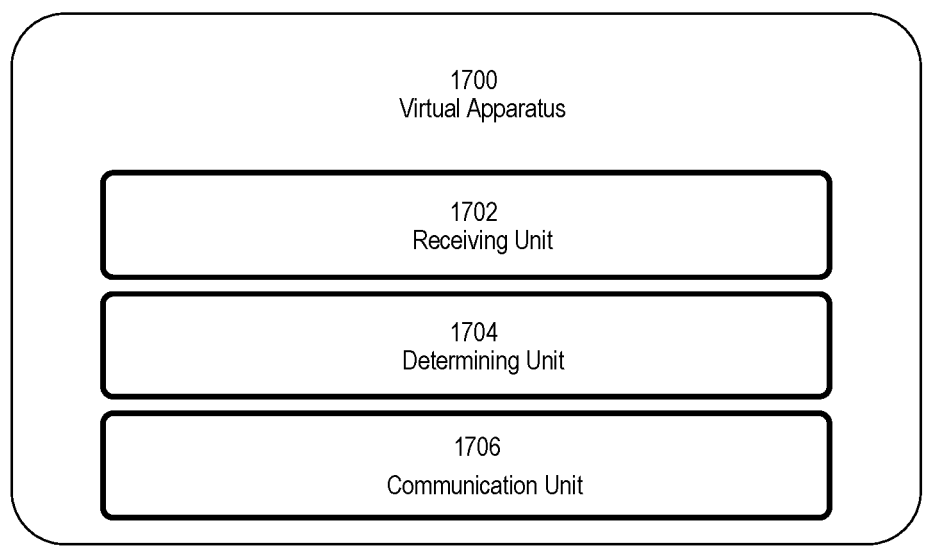
FIG. 17 is a block diagram illustrating an example of a virtual apparatus, in accordance with certain examples.

FIG. 17 illustrates a schematic block diagram of an apparatus 1700 in a wireless network (for example, the wireless network shown in FIG. 5). The apparatus may be implemented in a network node (e.g., network node 160 shown in FIG. 5). Apparatus 1700 is operable to carry out the example method described with reference to FIG. 16 and possibly any other processes or methods disclosed herein. It is also to be understood that the method of FIG. 16 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several examples. In some implementations, the processing circuitry may be used to cause receiving unit 1702, determining unit 1704, communication unit 1706, and any other suitable units of apparatus 1700 to perform corresponding functions according one or more examples of the present disclosure.

In certain examples, apparatus 1700 may be an eNB or a gNB. As illustrated in FIG. 17, apparatus 1700 includes receiving unit 1702, determining unit 1704, and communication unit 1706. Receiving unit 1702 may be configured to perform the receiving functions of apparatus 1700. For example, receiving unit 1702 may be configured to receive a CSI report from a wireless device, the CSI report comprising a CSI Part 1 and a CSI Part 2, the CSI Part 1. In some examples, the CSI Part 1 comprises an indication of a number of non-zero coefficients. In further examples the number of non-zero coefficients is dependent on a rank restriction of the wireless device. In further examples the payload size of the indication of number of non-zero coefficients is dependent on a rank restriction of the wireless device In some examples the CSI Part 1 indicates a rank and a number of non-zero coefficients. As another example, receiving unit 1702 may be configured to receive a CSI report from a wireless device, the CSI report comprising a CSI Part 1 and a CSI Part 2, the CSI Part 1 comprising one or more indicators of a number of non-zero coefficients, the number of non-zero coefficients dependent on a rank restriction. As still another example, receiving unit 1702 may be configured to receive a CSI report from a wireless device, the CSI report comprising a CSI Part 1 and a CSI Part 2, the CSI Part 1 comprising at least one of: an indicator of a number of non-zero coefficients for layer 0, if reported; and an indicator of a number of non-zero coefficients for layer 1. As yet another example, receiving unit 1702 may be configured to obtain user data.

Receiving unit 1702 may receive any suitable information (e.g., from a wireless device or another network node). Receiving unit 1702 may include a receiver and/or a transceiver, such as RF transceiver circuitry 172 described above in relation to FIG. 5. Receiving unit 1702 may include circuitry configured to receive messages and/or signals (wireless or wired). In particular examples, receiving unit 1702 may communicate received messages and/or signals to determining unit 1704 and/or any other suitable unit of apparatus 1700. The functions of receiving unit 1702 may, in certain examples, be performed in one or more distinct units.

Determining unit 1704 may perform the processing functions of apparatus 1700. For example, determining unit 1704 may be configured to determine, based on the indication of the number of non-zero coefficients, one or more of a CSI payload of the CSI Part 2 and a CSI payload size for the CSI Part 2. In some examples the rank is explicitly indicated, in other examples the rank is implicitly indicated. In other examples the network node determines, based on the rank and the number of non-zero coefficients, one or more of a CSI payload of the CSI Part 2 and a CSI payload size for the CSI Part 2. As another example, determining unit 1704 may be configured to determine, based on the one or more indicators of the number of non-zero coefficients, one or more of a CSI payload of the CSI Part 2 and a CSI payload size for the CSI Part 2. As another example, determining unit 1704 may be configured to obtain user data. As yet another example, determining unit 1704 may be configured to determine, based on at least one of the indicator of the number of non-zero coefficients for layer 0 and the indicator of the number of non-zero coefficients for layer 1, one or more of a CSI payload of the CSI Part 2 and a CSI payload size for the CSI Part 2.

Determining unit 1704 may include or be included in one or more processors, such as processing circuitry 170 described above in relation to FIG. 5. Determining unit 1704 may include analog and/or digital circuitry configured to perform any of the functions of determining unit 1704 and/or processing circuitry 170 described above. The functions of determining unit 1704 may, in certain examples, be performed in one or more distinct units.

Communication unit 1706 may be configured to perform the transmission functions of apparatus 1700. For example, communication unit 1706 may be configured to forward the user data to a host computer or a wireless device.

Communication unit 1706 may transmit messages (e.g., to a wireless device and/or another network node). Communication unit 1706 may include a transmitter and/or a transceiver, such as RF transceiver circuitry 172 described above in relation to FIG. 5. Communication unit 1706 may include circuitry configured to transmit messages and/or signals (e.g., through wireless or wired means). In particular examples, communication unit 1706 may receive messages and/or signals for transmission from determining unit 1704 or any other unit of apparatus 1700. The functions of communication unit 1704 may, in certain examples, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. In some examples a computer program, computer program product or computer readable storage medium comprises instructions which when executed on a computer perform any of the examples disclosed herein. In further examples the instructions are carried on a signal or carrier and which are executable on a computer wherein when executed perform any of the examples disclosed herein.

The following are examples to provide further explanation of the solutions described herein.

Group A Examples

1. A method performed by a wireless device for indicating a number of non-zero coefficients for Type II channel state information (CSI), the method comprising:
    generating a CSI report, the CSI report comprising a CSI Part 1 and a CSI Part 2; and
    transmitting the CSI report to a network node, wherein the CSI Part 1 indicates a rank and a number of non-zero coefficients, the rank and the number of non-zero coefficients facilitating a determination of one or more of a payload of the CSI Part 2 and a payload size of the CSI Part 2.
2. The method of example 1, wherein the CSI Part I indicates the number of non-zero coefficients for each layer.
3. The method of example 2, wherein the number of non-zero coefficients for each layer is indicated with a layer-wise separate indicator in CSI Part 1.
4. The method of any of examples 2-3, wherein the indication of the number of non-zero coefficients has a bitwidth of $$\left\lceil \log_2 \max_R K_0(R, l) \right\rceil.$$

5. The method of example 4, wherein a payload size of the indication of the number of non-zero coefficients is constant irrespective of a rank selection by the wireless device.
6. The method of any of examples 1-3, wherein a payload size of the indication of the number of non-zero coefficients is based on one or more of:
    allowable ranks the wireless device is allowed to select; and
    a maximum rank the wireless device is allowed to select.
7. The method of any of examples 1-6, wherein the CSI Part 1 includes an explicit rank indication indicating the rank.
8. The method of any of examples 1-6, wherein the CSI Part 1 indicates the rank implicitly based on the indication of the number of non-zero coefficients.
9. The method of any of examples 1-6, wherein an indication of the rank and an indication of the number of non-zero coefficients are jointly encoded into a single index.
10. The method of example 1, wherein the CSI Part I indicates a total number of non-zero coefficients across all layers.
11. The method of example 10, wherein a UCI parameter in CSI Part I indicates a sum of the non-zero coefficients across all layers.
12. The method of any of examples 10-11, wherein the CSI Part I includes an explicit rank indication.
13. The method of any of examples 10-12, further comprising obtaining a configuration for a maximum number of non-zero coefficients summed over all layers for a given rank.
14. The method of any of examples 10-12, further comprising determining a maximum number of non-zero coefficients summed over all layers for a given rank.
15. The method of any of examples 1-14, wherein the CSI Part 1 comprises one or more indicators of a number of non-zero coefficients, the number of non-zero coefficients dependent on a rank restriction.

16. The method of any of the previous examples, further comprising:
    providing user data; and
    forwarding the user data to a host computer via the transmission to a base station.
17. A method performed by a wireless device for indicating a number of non-zero coefficients for Type II channel state information (CSI), the method comprising:
    generating a CSI report, the CSI report comprising a CSI Part 1 and a CSI Part 2; and
    transmitting the CSI report to a network node, wherein the CSI Part 1 comprises one or more indicators of a number of non-zero coefficients, the number of non-zero coefficients dependent on a rank restriction.
18. A method performed by a wireless device for indicating a number of non-zero coefficients for Type II channel state information (CSI), the method comprising:
    generating a CSI report, the CSI report comprising a CSI Part 1 and a CSI Part 2; and
    transmitting the CSI report to a network node, wherein the CSI Part 1 comprises at least one of:
    i. an indicator of a number of non-zero coefficients for layer 0, if reported; and
    ii. an indicator of a number of non-zero coefficients for layer 1.
19. The method of example 18, wherein:
    2-layer PMI reporting is allowed according to a rank restriction; and
    the CSI Part 1 comprises both the indicator of the number of non-zero coefficients for layer 0 and
    the indicator of the number of non-zero coefficients for layer 1.

Group B Examples

20. A method performed by a network node, the method comprising:
    receiving a channel state information (CSI) report from a wireless device, the CSI report comprising a CSI Part 1 and a CSI Part 2, the CSI Part 1 indicating a rank and a number of non-zero coefficients; and
    determining, based on the indication of the rank and the number of non-zero coefficients, one or more of a CSI payload of the CSI Part 2 and a CSI payload size for the CSI Part 2.
21. The method of example 20, wherein the CSI Part I indicates the number of non-zero coefficients for each layer.
22. The method of example 21, wherein the number of non-zero coefficients for each layer is indicated with a layer-wise separate indicator in CSI Part 1.
23. The method of any of examples 20-21, wherein the indication of the number of non-zero coefficients has a bitwidth of $$\left\lceil \log_2 \max_R K_0(R, l) \right\rceil.$$

24. The method of example 23, wherein a payload size of the indication of the number of non-zero coefficients is constant irrespective of a rank selection by the wireless device.
25. The method of any of examples 20-22, wherein a payload size of the indication of the number of non-zero coefficients is based on one or more of:
    allowable ranks the wireless device is allowed to select; and
    a maximum rank the wireless device is allowed to select.
26. The method of any of examples 20-25, wherein the CSI Part 1 includes an explicit rank indication indicating the rank.
27. The method of any of examples 20-25, wherein the CSI Part 1 indicates the rank implicitly based on the indication of the number of non-zero coefficients.
28. The method of any of examples 20-25, wherein an indication of the rank and an indication of the number of non-zero coefficients are jointly encoded into a single index.
29. The method of example 20, wherein the CSI Part I indicates a total number of non-zero coefficients across all layers.
30. The method of example 29, wherein a UCI parameter in CSI Part I indicates a sum of the non-zero coefficients across all layers.
31. The method of any of examples 29-30, wherein the CSI Part I includes an explicit rank indication.
32. The method of any of examples 20-31, wherein the CSI Part 1 comprises one or more indicators of a number of non-zero coefficients, the number of non-zero coefficients dependent on a rank restriction.
33. The method of any of the previous examples, further comprising:
    obtaining user data; and
    forwarding the user data to a host computer or a wireless device.
34. A method performed by a network node, the method comprising:
    receiving a channel state information (CSI) report from a wireless device, the CSI report comprising a CSI Part 1 and a CSI Part 2, the CSI Part 1 comprising one or more indicators of a number of non-zero coefficients, the number of non-zero coefficients dependent on a rank restriction; and
    determining, based on the one or more indicators of the number of non-zero coefficients, one or more of a CSI payload of the CSI Part 2 and a CSI payload size for the CSI Part 2.
35. A method performed by a network node, the method comprising:
    receiving a channel state information (CSI) report from a wireless device, the CSI report comprising a CSI Part 1 and a CSI Part 2, the CSI Part 1 comprising at least one of:
    i. an indicator of a number of non-zero coefficients for layer 0, if reported; and
    ii. an indicator of a number of non-zero coefficients for layer 1.
    determining, based on at least one of the indicator of the number of non-zero coefficients for layer 0 and the indicator of the number of non-zero coefficients for layer 1, one or more of a CSI payload of the CSI Part 2 and a CSI payload size for the CSI Part 2.
36. The method of example 18, wherein:
    2-layer PMI reporting is allowed according to a rank restriction; and
    the CSI Part 1 comprises both the indicator of the number of non-zero coefficients for layer 0 and the indicator of the number of non-zero coefficients for layer 1.

Group C Examples

37. A wireless device, the wireless device comprising:
    processing circuitry configured to perform any of the steps of any of the Group A examples; and
    power supply circuitry configured to supply power to the wireless device.
38. A network node, the network node comprising:
    processing circuitry configured to perform any of the steps of any of the Group B examples;
    power supply circuitry configured to supply power to the wireless device.
39. A user equipment (UE), the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A examples;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
40. A computer program, the computer program comprising instructions which when executed on a computer perform any of the steps of any of the Group A examples.
41. A computer program product comprising a computer program, the computer program comprising instructions which when executed on a computer perform any of the steps of any of the Group A examples.
42. A non-transitory computer-readable storage medium or carrier comprising a computer program, the computer program comprising instructions which when executed on a computer perform any of the steps of any of the Group A examples.
43. A computer program, the computer program comprising instructions which when executed on a computer perform any of the steps of any of the Group B examples.
44. A computer program product comprising a computer program, the computer program comprising instructions which when executed on a computer perform any of the steps of any of the Group B examples.
45. A non-transitory computer-readable storage medium or carrier comprising a computer program, the computer program comprising instructions which when executed on a computer perform any of the steps of any of the Group B examples.
46. A communication system including a host computer comprising:
    processing circuitry configured to provide user data; and
    a communication interface configured to forward the user data to a cellular network for transmission to a user equipment (UE),
    wherein the cellular network comprises a network node having a radio interface and processing circuitry, the network node's processing circuitry configured to perform any of the steps of any of the Group B examples.
47. The communication system of the pervious example further including the network node.
48. The communication system of the previous 2 examples, further including the UE, wherein the UE is configured to communicate with the network node.
49. The communication system of the previous 3 examples, wherein:
    the processing circuitry of the host computer is configured to execute a host application, thereby providing the user data; and
    the UE comprises processing circuitry configured to execute a client application associated with the host application.
50. A method implemented in a communication system including a host computer, a network node and a user equipment (UE), the method comprising:
    at the host computer, providing user data; and
    at the host computer, initiating a transmission carrying the user data to the UE via a cellular network comprising the network node, wherein the network node performs any of the steps of any of the Group B examples.
51. The method of the previous example, further comprising, at the network node, transmitting the user data.
52. The method of the previous 2 examples, wherein the user data is provided at the host computer by executing a host application, the method further comprising, at the UE, executing a client application associated with the host application.
53. A user equipment (UE) configured to communicate with a network node, the UE comprising a radio interface and processing circuitry configured to performs the of the previous 3 examples.
54. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A examples.
55. The communication system of the previous example, wherein the cellular network further includes a network node configured to communicate with the UE.
56. The communication system of the previous 2 examples, wherein:
    the processing circuitry of the host computer is configured to execute a host application, thereby providing the user data; and
    the UE's processing circuitry is configured to execute a client application associated with the host application.
57. A method implemented in a communication system including a host computer, a network node and a user equipment (UE), the method comprising:
    at the host computer, providing user data; and
    at the host computer, initiating a transmission carrying the user data to the UE via a cellular network comprising the network node, wherein the UE performs any of the steps of any of the Group A examples.
58. The method of the previous example, further comprising at the UE, receiving the user data from the network node.

59. A communication system including a host computer comprising:
    communication interface configured to receive user data originating from a transmission from a user equipment (UE) to a network node,
    wherein the UE comprises a radio interface and processing circuitry, the UE's processing circuitry configured to perform any of the steps of any of the Group A examples.
60. The communication system of the previous example, further including the UE.
61. The communication system of the previous 2 examples, further including the network node, wherein the network node comprises a radio interface configured to communicate with the UE and a communication interface configured to forward to the host computer the user data carried by a transmission from the UE to the network node.
62. The communication system of the previous 3 examples, wherein:
    the processing circuitry of the host computer is configured to execute a host application; and
    the UE's processing circuitry is configured to execute a client application associated with the host application, thereby providing the user data.
63. The communication system of the previous 4 examples, wherein:
    the processing circuitry of the host computer is configured to execute a host application, thereby providing request data; and
    the UE's processing circuitry is configured to execute a client application associated with the host application, thereby providing the user data in response to the request data.
64. A method implemented in a communication system including a host computer, a network node and a user equipment (UE), the method comprising:
    at the host computer, receiving user data transmitted to the network node from the UE, wherein the UE performs any of the steps of any of the Group A examples.
65. The method of the previous example, further comprising, at the UE, providing the user data to the network node.
66. The method of the previous 2 examples, further comprising:
    at the UE, executing a client application, thereby providing the user data to be transmitted; and
    at the host computer, executing a host application associated with the client application.
67. The method of the previous 3 examples, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
68. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the Group B examples.
69. The communication system of the previous example further including the network node.
70. The communication system of the previous 2 examples, further including the UE, wherein the UE is configured to communicate with the network node.
71. The communication system of the previous 3 examples, wherein:
    the processing circuitry of the host computer is configured to execute a host application;
    the UE is configured to execute a client application associated with the host application, thereby providing the user data to be received by the host computer.
72. A method implemented in a communication system including a host computer, a network node and a user equipment (UE), the method comprising:
    at the host computer, receiving, from the network node, user data originating from a transmission which the network node has received from the UE, wherein the UE performs any of the steps of any of the Group A examples.
73. The method of the previous example, further comprising at the network node, receiving the user data from the UE.
74. The method of the previous 2 examples, further comprising at the network node, initiating a transmission of the received user data to the host computer.

The invention claimed is:

1. A method performed by a wireless device for multi-beam precoder based channel state information, CSI, feedback reporting, wherein a CSI report comprises a first part, CSI Part 1, and a second part, CSI Part 2, the method comprising:
    generating the CSI report, wherein the CSI Part 1 comprises an indication of a number of non-zero coefficients, and a payload size of the indication of the number of non-zero coefficients is dependent on a rank restriction of the wireless device; and
    transmitting the CSI report to a network node, wherein one or more of a payload of the CSI Part 2 and a payload size of the CSI Part 2 is based on the number of non-zero coefficients indicated in the CSI Part 1.

2. The method of claim 1, wherein the indication of the number of non-zero coefficients comprises an indicator of a number of non-zero coefficients for each layer and the number of non-zero coefficients for each layer is indicated with a layer-wise separate indicator in CSI Part 1.

3. The method of claim 1, wherein the payload size of the indication of the number of non-zero coefficients is constant irrespective of a rank selection by the wireless device.

4. The method of claim 1, wherein the CSI Part 1 includes an explicit rank indication indicating the rank.

5. The method of claim 1, wherein the CSI Part 1 indicates the rank implicitly based on the indication of the number of non-zero coefficients.

6. A method performed by a network node for receiving multibeam precoder based channel state information, CSI, feedback, wherein a CSI report comprises a first part, CSI Part 1, and a second part, CSI Part 2, the method comprising:
    receiving from a wireless device the CSI Part 1, wherein the CSI Part 1 comprises an indication of a number of non-zero coefficients, and a payload size of the indication of the number of non-zero coefficients is dependent on a rank restriction of the wireless device; and
    determining, based on the indication of the number of non-zero coefficients, one or more of a CSI payload of the CSI Part 2 and a CSI payload size for the CSI Part 2.

7. The method of claim 6, wherein the indication of the number of non-zero coefficients comprises an indicator of a number of non-zero coefficients for each layer and the number of non-zero coefficients for each layer is indicated with a layer-wise separate indicator in the CSI Part 1.

8. The method of claim 6, wherein a payload size of the indication of the number of non-zero coefficients is constant irrespective of a rank selection by the wireless device.

9. The method of claim 6, wherein the CSI Part 1 includes an explicit rank indication indicating the rank.

10. The method of claim 6, wherein the CSI Part 1 indicates the rank implicitly based on the indication of the number of non-zero coefficients.

11. A wireless device, the wireless device comprising processing circuitry and power supply circuitry configured to supply power to the wireless device, the processing circuitry configured to:
generate a CSI report for multibeam precoder based channel state information, CSI, feedback reporting, wherein the CSI report comprises a first part, CSI Part 1, and a second part, CSI Part 2, and wherein the CSI Part 1 comprises an indication of a number of non-zero coefficients, and a payload size of the indication of the number of non-zero coefficients is dependent on a rank restriction; and
transmit the CSI report to a network node, wherein one or more of a payload of the CSI Part 2 and a payload size of the CSI Part 2 is based on the number of non-zero coefficients indicated in the CSI Part 1.

12. The wireless device of claim 11, wherein the indication of the number of non-zero coefficients comprises an indicator of a number of non-zero coefficients for each layer and the number of non-zero coefficients for each layer is indicated with a layer-wise separate indicator in CSI Part 1.

13. The wireless device of claim 11, wherein a payload size of the indication of the number of non-zero coefficients is constant irrespective of a rank selection by the wireless device.

14. The wireless device of claim 11, wherein the CSI Part 1 includes an explicit rank indication indicating the rank.

15. The wireless device of claim 11, wherein the CSI Part 1 indicates the rank implicitly based on the indication of the number of non-zero coefficients.

16. A network node, the network node comprising processing circuitry and power supply circuitry configured to supply power to the network node, the processing circuitry configured to:
receive a multibeam precoder based channel state information, CSI, feedback report from a wireless device, the CSI report comprising a first part, CSI Part 1, and a second part, CSI Part 2, wherein the CSI Part 1 comprises an indication of a number of non-zero coefficients, and a payload size of the indication of the number of non-zero coefficients is dependent on a rank restriction of the wireless device; and
determine, based on the indication of the number of non-zero coefficients, one or more of a CSI payload of the CSI Part 2 and a CSI payload size for the CSI Part 2.

17. The network node of claim 16, wherein the indication of the number of non-zero coefficients comprises an indicator of the number of non-zero coefficients for each layer and the number of non-zero coefficients for each layer is indicated with a layer-wise separate indicator in the CSI Part 1.

18. The network node of claim 16, wherein the payload size of the indication of the number of non-zero coefficients is constant irrespective of a rank selection by the wireless device.

19. The network node of claim 16, wherein the CSI Part 1 includes an explicit rank indication indicating the rank.

20. The network node of claim 16, wherein the CSI Part 1 indicates the rank implicitly based on the indication of the number of non-zero coefficients.

* * * * *